(12) United States Patent
Wu et al.

(10) Patent No.: US 8,158,744 B1
(45) Date of Patent: Apr. 17, 2012

(54) DITHIOKETOPYRROLOPYRROLE-BASED POLYMERS

(75) Inventors: Yiliang Wu, Oakville (CA); Ping Liu, Mississauga (CA); Anthony James Wigglesworth, Oakville (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/037,466

(22) Filed: Mar. 1, 2011

(51) Int. Cl.
*C08G 14/10* (2006.01)
(52) U.S. Cl. .......... 528/163; 528/216; 528/117; 528/54; 528/94; 528/377; 528/380; 257/40
(58) Field of Classification Search .................. 528/163, 528/216, 117, 54, 94, 377, 380; 257/40
See application file for complete search history.

(56) References Cited

U.S. PATENT DOCUMENTS
4,760,151 A 7/1988 Rochat et al.
2009/0065766 A1 3/2009 Li

FOREIGN PATENT DOCUMENTS
WO WO2011025455 * 3/2011

OTHER PUBLICATIONS

Tamayo et al., Design, Synthesis, and Self-assembly of Oligothiophene Derivatives with a Diketopyrrolopyrrole Core, American Chemical Society, Published on Web Sep. 6, 2008.

* cited by examiner

*Primary Examiner* — Randy Gulakowski
*Assistant Examiner* — Shane Fang
(74) *Attorney, Agent, or Firm* — Fay Sharpe LLP

(57) ABSTRACT

A polymer of Formula (I)

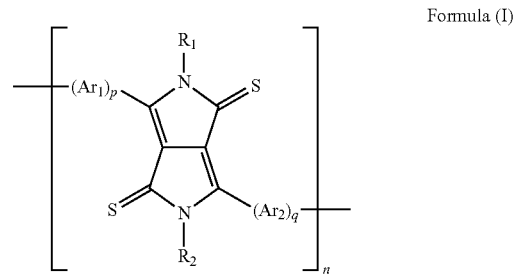

wherein $R_1$, $R_2$, $Ar_1$, $Ar_2$, and n are as described herein. The polymer may be used in a semiconducting layer of an electronic device.

20 Claims, 4 Drawing Sheets

DITHIOKETOPYRROLOPYRROLE-BASED POLYMERS

BACKGROUND

The present disclosure relates to thin-film transistors (TFTs) and/or other electronic devices comprising a semiconducting layer. The semiconducting layer is formed from a semiconductor composition as described herein. When the composition is used in the semiconducting layer of a device, high mobility and excellent stability may be achieved.

TFTs are generally composed of, on a substrate, an electrically conductive gate electrode, source and drain electrodes, an electrically insulating gate dielectric layer which separate the gate electrode from the source and drain electrodes, and a semiconducting layer which is in contact with the gate dielectric layer and bridges the source and drain electrodes. Their performance can be determined by the field effect mobility and the current on/off ratio of the overall transistor. High mobility and high on/off ratio are desired.

Organic thin-film transistors (OTFTs) can be used in applications such as radio frequency identification (RFID) tags and backplane switching circuits for displays, such as signage, readers, and liquid crystal displays, where high switching speeds and/or high density are not essential. They also have attractive mechanical properties such as being physically compact, lightweight, and flexible.

Organic thin-film transistors can be fabricated using low-cost solution-based patterning and deposition techniques, such as spin coating, solution casting, dip coating, stencil/screen printing, flexography, gravure, offset printing, ink jet-printing, micro-contact printing, and the like. To enable the use of these solution-based processes in fabricating thin-film transistor circuits, solution processable materials are therefore required. However, organic or polymeric semiconductors formed by solution processing tend to suffer from limited solubility, air sensitivity, and especially low field-effect mobility. This poor performance may be attributable to the poor film-forming nature of small molecules.

It would be desirable to develop semiconducting polymers that exhibit high field effect mobility, air stability, and good solubility.

BRIEF DESCRIPTION

The present application discloses, in various embodiments, semiconductor materials of Formula (I):

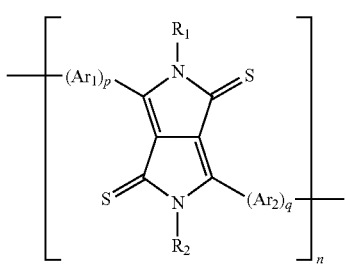

Formula (I)

wherein $R_1$ and $R_2$ are independently hydrogen, alkyl, substituted alkyl, aryl, or substituted aryl; each $Ar_1$ and $Ar_2$ is independently ethenyl, ethynyl, aryl, substituted aryl, heteroaryl, or substituted heteroaryl; p and q are the number of $Ar_1$ and $Ar_2$ units and are independently from 1 to about 25; and wherein n is the number of repeating units and is from 2 to about 5,000.

In embodiments, at least one $Ar_1$ or $Ar_2$ unit is thieno[3,2-b]thiophene:

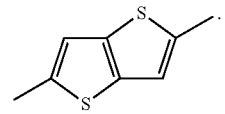

Each $Ar_1$ and $Ar_2$ unit may be independently selected from the group consisting of:

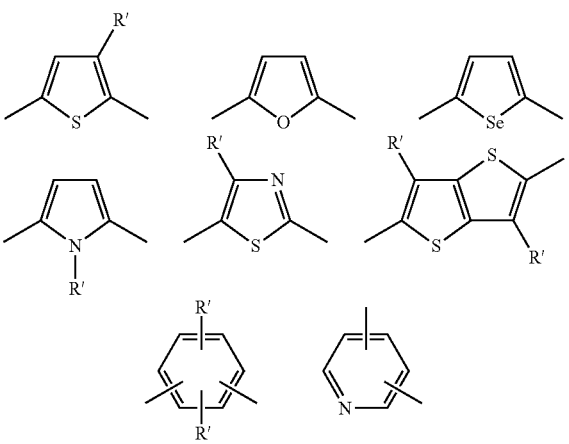

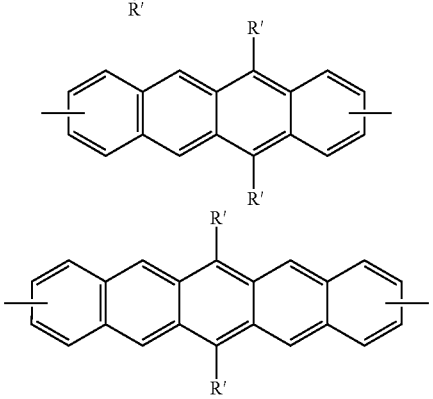

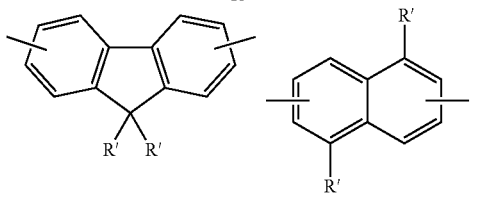

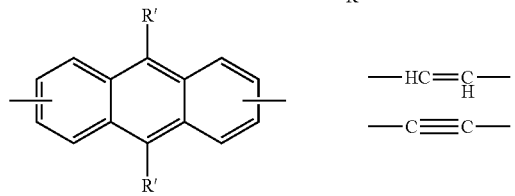

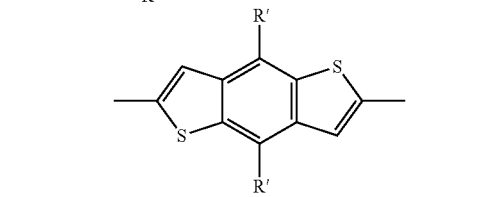

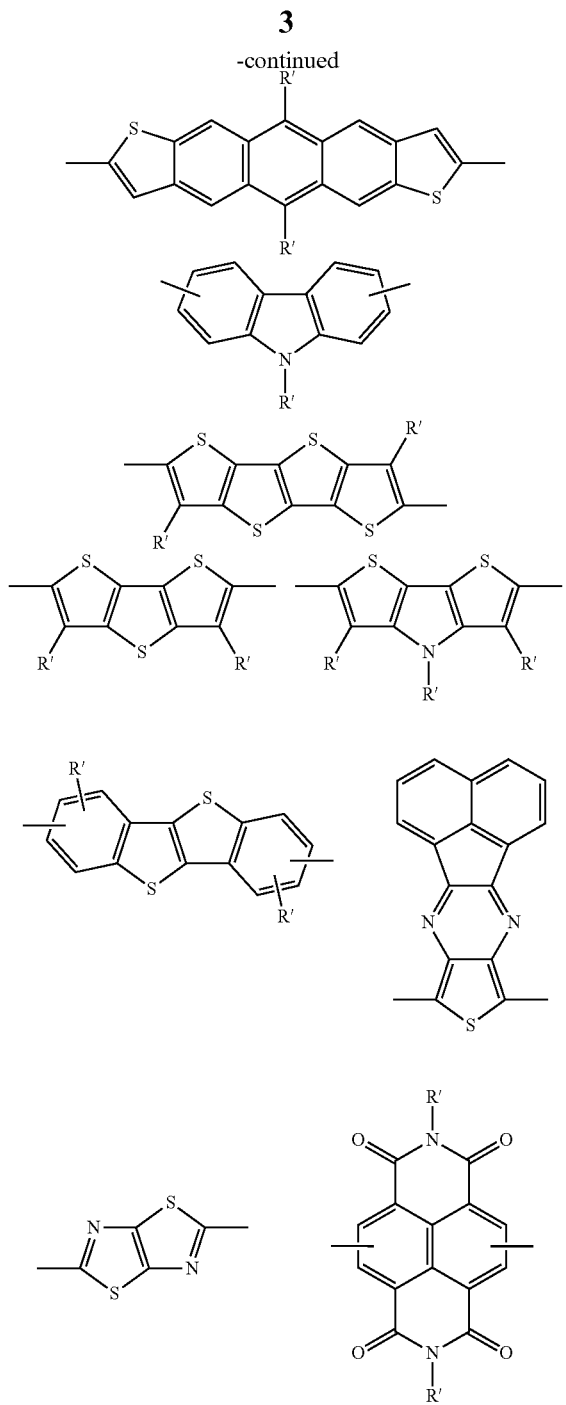
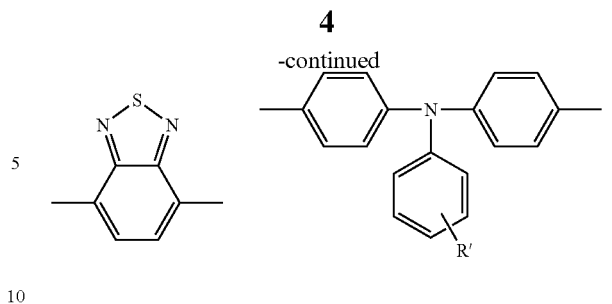

and combinations thereof, wherein R' is independently selected from hydrogen, alkyl, substituted alkyl, aryl, substituted aryl, heteroaryl, substituted heteroaryl, halogen, alkoxy, alkylthio, trialkylsilyl, —CN, or —NO₂.

R₁ and R₂ may be the same. In some embodiments, R₁ and R₂ are alkyl.

Also disclosed is a polymer of Formula (II):

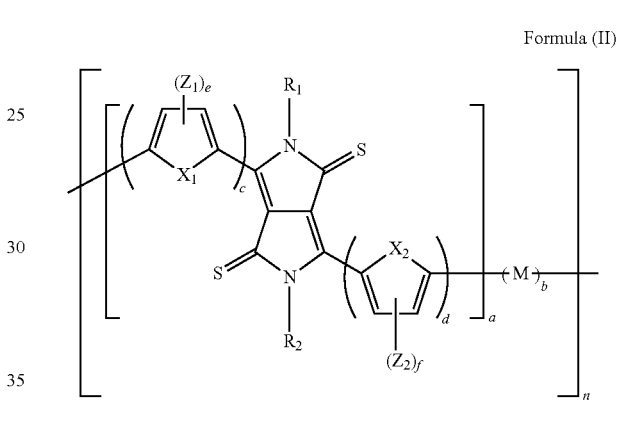

Formula (II)

wherein R₁ and R₂ are independently hydrogen, alkyl, substituted alkyl, heteroaryl, substituted aryl, or substituted heteroaryl; X₁ and X₂ are independently S, Se, O, or NR", wherein each R" can independently be hydrogen or alkyl; each Z₁ and Z₂ is independently alkyl, substituted alkyl, aryl, substituted aryl, heteroaryl, substituted heteroaryl, halogen, alkoxy, alkylthio, trialkylsilyl, —CN, or —NO₂; M is a conjugated moiety; a, c, and d are independently at least 1; b is from 0 to about 20; e and f are independently from 0 to 2; and n is from 2 to about 5,000.

The polymer may have the structure of one of Formulas (1)-(20):

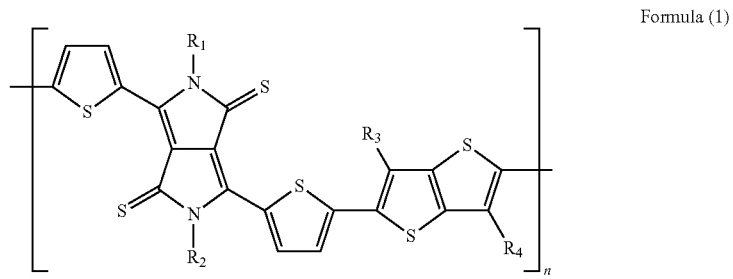

Formula (1)

-continued
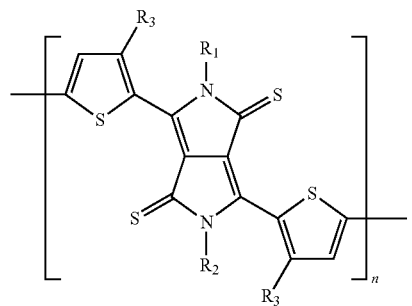
Formula (2)
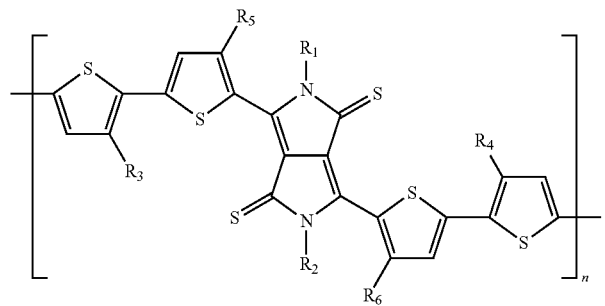
Formula (3)
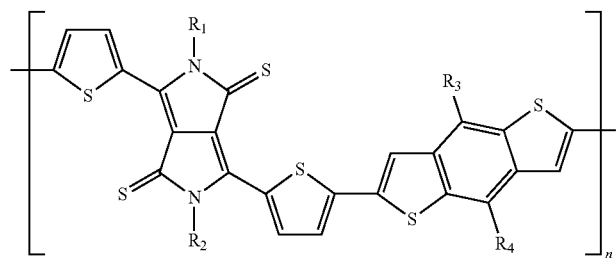
Formula (4)
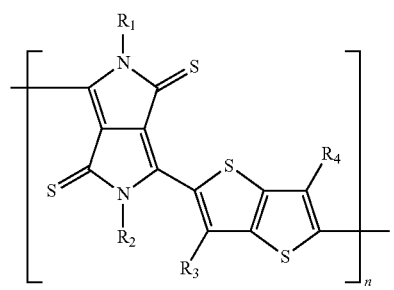
Formula (5)
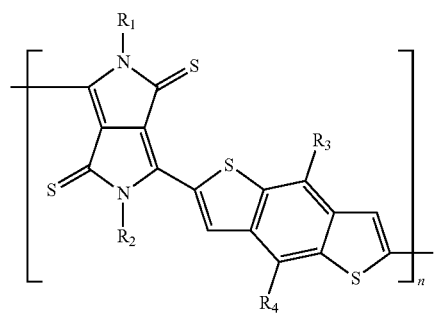
Formula (6)

-continued
Formula (7)
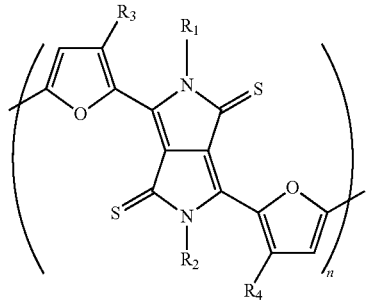
Formula (8)
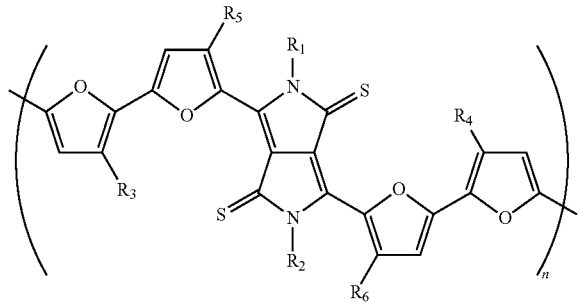
Formula (9)
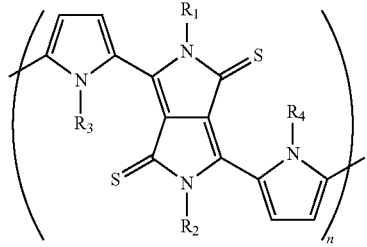
Formula (10)
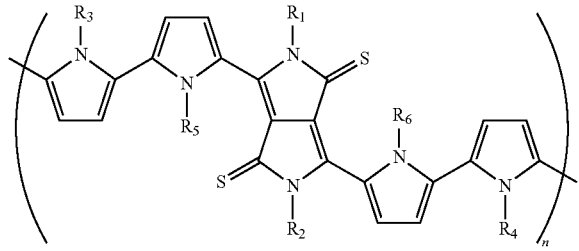
Formula (11)
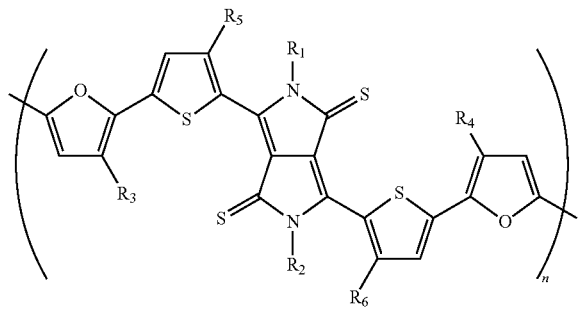

-continued
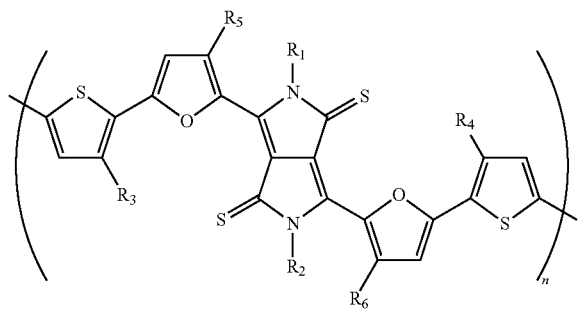
Formula (12)
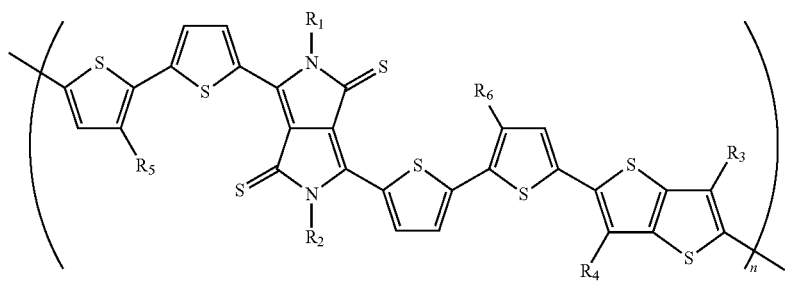
Formula (13)
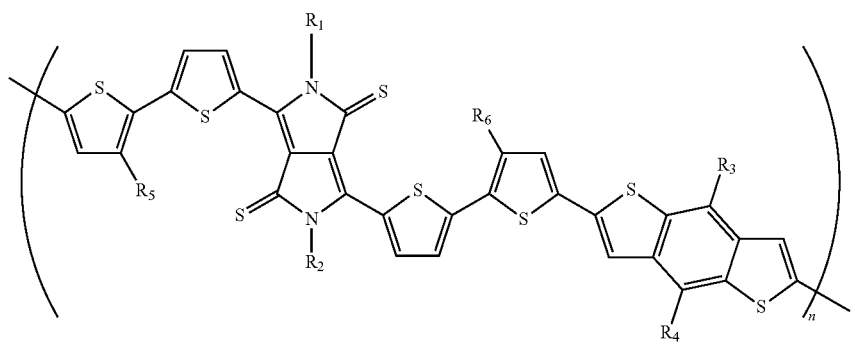
Formula (14)
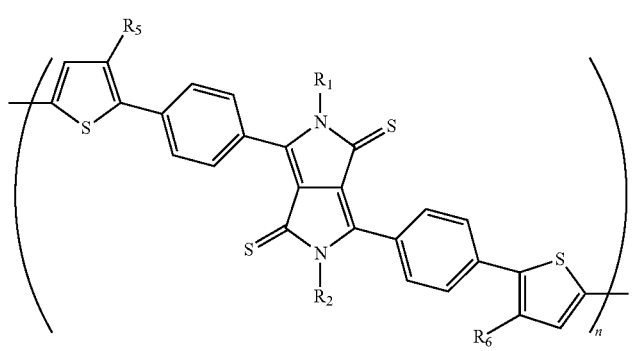
Formula (15)
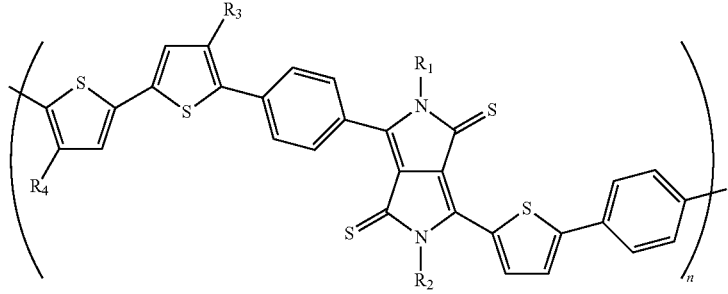
Formula (16)

-continued

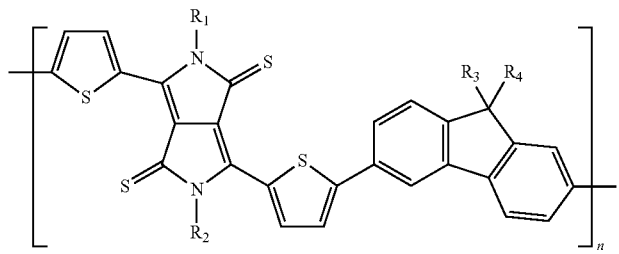

Formula (17)

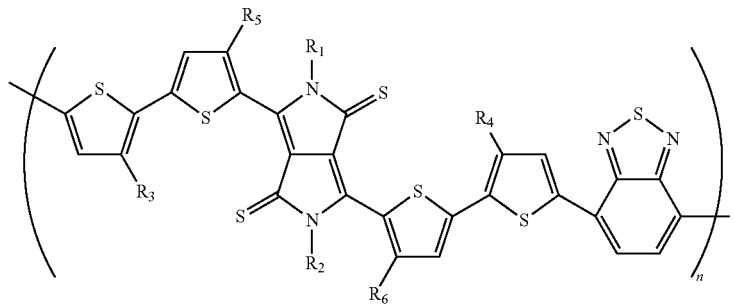

Formula (18)

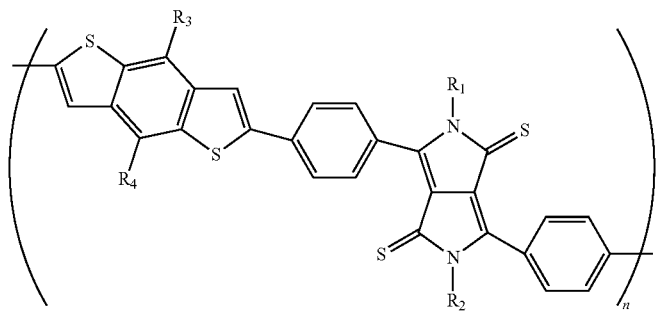

Formula (19)

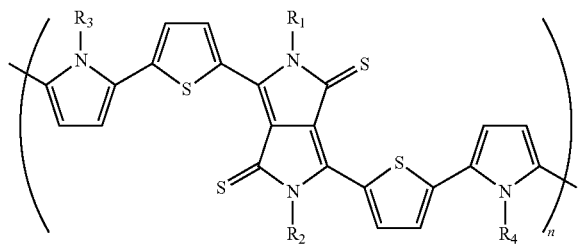

Formula (20)

wherein $R_1$ and $R_2$ are independently hydrogen, alkyl, substituted alkyl, aryl, or substituted aryl; $R_3$, $R_4$, $R_5$, and $R_6$ are independently hydrogen, alkyl, substituted alkyl, aryl, substituted aryl, heteroaryl, substituted heteroaryl, halogen, alkoxy, alkylthio, trialkylsilyl, —CN, or —NO$_2$; and n is from 2 to about 5,000.

Further disclosed is a semiconductor composition comprising a semiconductor polymer of Formula (I):

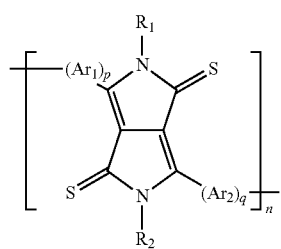

Formula (I)

wherein $R_1$ and $R_2$ are independently hydrogen, alkyl, substituted alkyl, aryl, or substituted aryl; each $Ar_1$ and $Ar_2$ is independently ethenyl, ethynyl, aryl, substituted aryl, heteroaryl, or substituted heteroaryl; p and q are the number of $Ar_1$ and $Ar_2$ units and are independently from 1 to about 25; and wherein n is the number of repeating units and is from 2 to about 5,000.

Still further disclosed is an electronic device comprising a semiconducting layer, the semiconducting layer comprising a polymer of Formula (I):

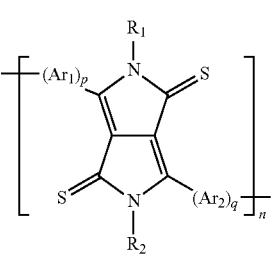

Formula (I)

wherein R₁ and R₂ are independently hydrogen, alkyl, substituted alkyl, aryl, or substituted aryl; each Ar₁ and Ar₂ is independently ethenyl, ethynyl, aryl, substituted aryl, heteroaryl, or substituted heteroaryl; p and q are the number of Ar₁ and Ar₂ units and are independently from 1 to about 25; and wherein n is the number of repeating units and is from 2 to about 5,000

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
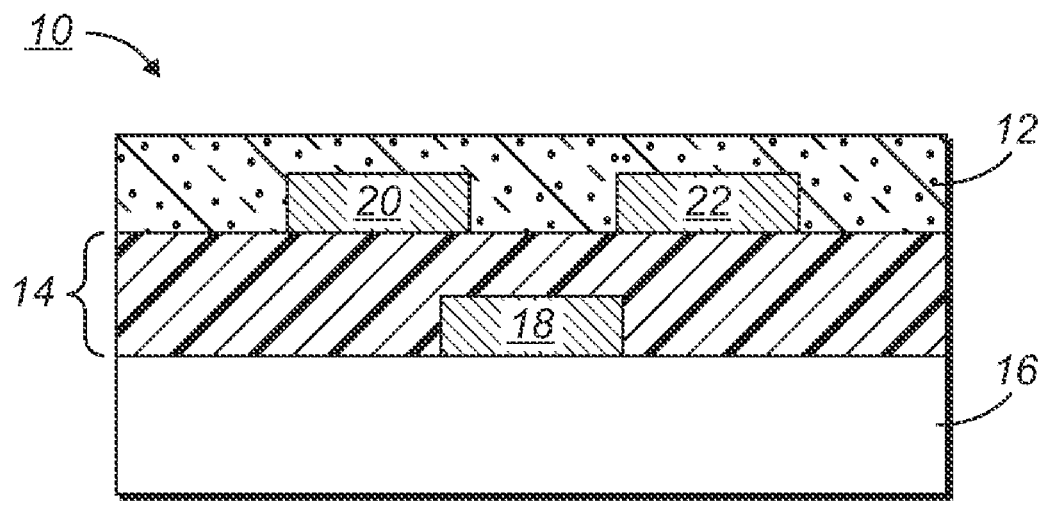
FIG. 1 is a diagram of a first embodiment of a TFT according to the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range of "from about 2 to about 10" also discloses the range "from 2 to 10."

The term "comprising" is used herein as requiring the presence of the named component and allowing the presence of other components. The term "comprising" should be construed to include the term "consisting of", which allows the presence of only the named component, along with any impurities that might result from the manufacture of the named component.

The present disclosure relates to semiconductor polymers as disclosed herein. The semiconductor polymers exhibit good solubility. Compositions comprising the semiconductor polymers are also disclosed. A semiconducting layer formed from the composition is very stable in air and has high mobility. These semiconductor compositions are useful for forming layers in electronic devices, such as thin-film transistors (TFTs).

FIG. 1 illustrates a bottom-gate bottom-contact TFT configuration according to the present disclosure. The TFT 10 comprises a substrate 16 in contact with the gate electrode 18 and a gate dielectric layer 14. The gate electrode 18 is depicted here atop the substrate 16, but the gate electrode could also be located in a depression within the substrate. It is important that the gate dielectric layer 14 separates the gate electrode 18 from the source electrode 20, drain electrode 22, and the semiconducting layer 12. The semiconducting layer 12 runs over and between the source and drain electrodes 20 and 22. The semiconductor has a channel length between the source and drain electrodes 20 and 22.

Figure 2:
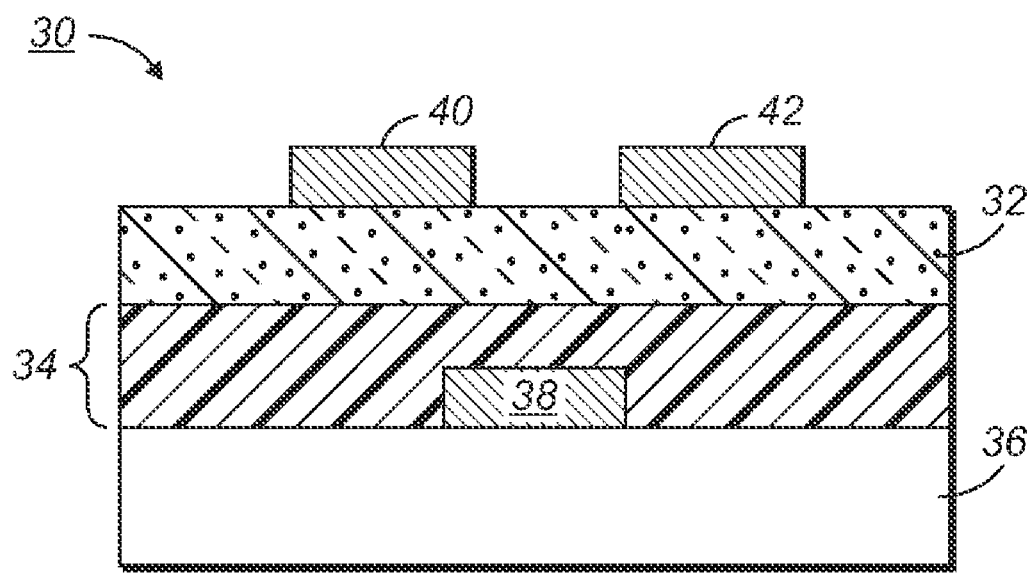
FIG. 2 is a diagram of a second embodiment of a TFT according to the present disclosure.

FIG. 2 illustrates another bottom-gate top-contact TFT configuration according to the present disclosure. The TFT 30 comprises a substrate 36 in contact with the gate electrode 38 and a gate dielectric layer 34. The semiconducting layer 32 is placed on top of the gate dielectric layer 34 and separates it from the source and drain electrodes 40 and 42.

Figure 3:
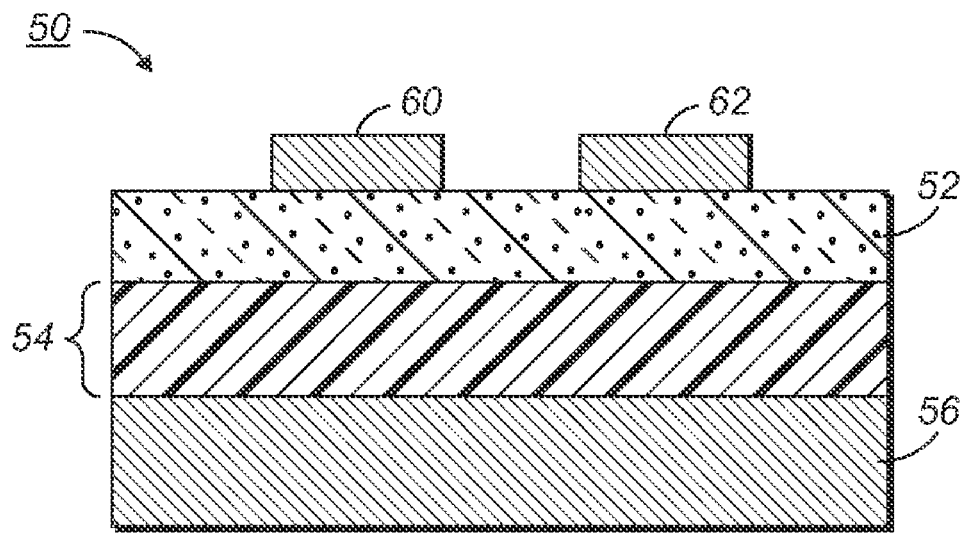
FIG. 3 is a diagram of a third embodiment of a TFT according to the present disclosure.

FIG. 3 illustrates a bottom-gate bottom-contact TFT configuration according to the present disclosure. The TFT 50 comprises a substrate 56 which also acts as the gate electrode and is in contact with a gate dielectric layer 54. The source electrode 60, drain electrode 62, and semiconducting layer 52 are located atop the gate dielectric layer 54.

Figure 4:
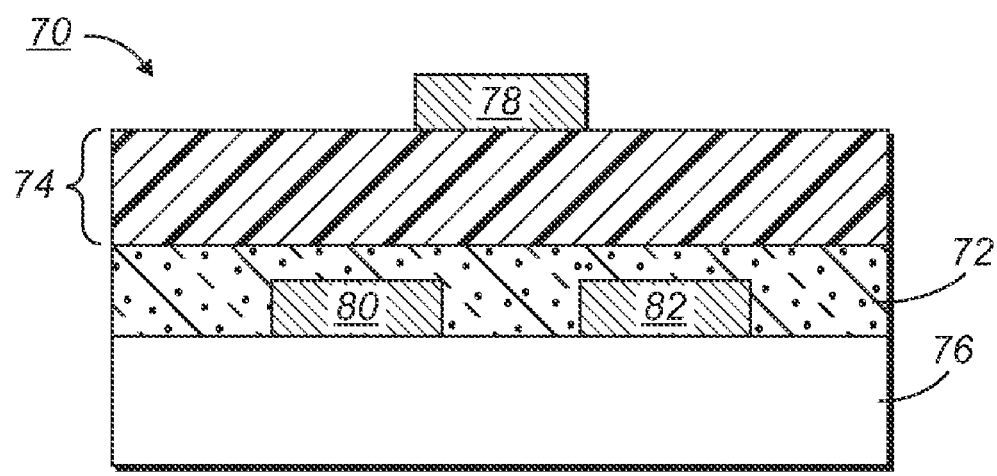
FIG. 4 is a diagram of a fourth embodiment of a TFT according to the present disclosure.

FIG. 4 illustrates a top-gate top-contact TFT configuration according to the present disclosure. The TFT 70 comprises a substrate 76 in contact with the source electrode 80, drain electrode 82, and the semiconducting layer 72. The semiconducting layer 72 runs over and between the source and drain electrodes 80 and 82. The gate dielectric layer 74 is on top of the semiconducting layer 72. The gate electrode 78 is on top of the gate dielectric layer 74 and does not contact the semiconducting layer 72.

The semiconductor polymer has the structure of Formula (I):

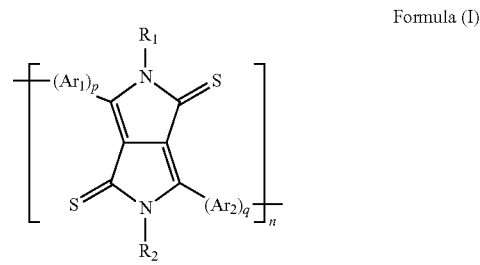

Formula (I)

wherein R₁ and R₂ are independently hydrogen, alkyl, substituted alkyl, aryl, or substituted aryl; each Ar₁ and Ar₂ is independently ethenyl, ethynyl, aryl, substituted aryl, heteroaryl, or substituted heteroaryl; p and q are the number of Ar₁ and Ar₂ units and are independently from 1 to about 25; and wherein n is the number of repeating units and is from 2 to about 5,000.

In more specific embodiments, p and q are independently from 1 to 3. In other embodiments, the sum of p+q is from 2 to 4. In some embodiments, R₁ and R₂ are the same. In particular embodiments, R₁ and R₂ are alkyl.

The term "alkyl" refers to a radical composed entirely of carbon atoms and hydrogen atoms which is fully saturated. The alkyl radical may be linear, branched, or cyclic. The alkyl radical can be univalent or divalent, i.e. can bond to one or two different non-hydrogen atoms.

The term "ethenyl" refers to the radical —CH=CH—.

The term "ethynyl" refers to the radical —C≡C—.

The term "aryl" refers to an aromatic radical composed entirely of carbon atoms and hydrogen atoms. When aryl is described in connection with a numerical range of carbon atoms, it should not be construed as including substituted aromatic radicals. For example, the phrase "aryl containing from 6 to 10 carbon atoms" should be construed as referring to a phenyl group (6 carbon atoms) or a naphthyl group (10 carbon atoms) only, and should not be construed as including a methylphenyl group (7 carbon atoms). The aryl radical may be univalent or divalent.

The term "substituted" refers to at least one hydrogen atom on the named radical being substituted with another functional group, such as halogen, —CN, —NO$_2$, —COOH, and —SO$_3$H. An exemplary substituted alkyl group is a perhaloalkyl group, wherein one or more hydrogen atoms in an alkyl group are replaced with halogen atoms, such as fluorine, chlorine, iodine, and bromine. Besides the aforementioned functional groups, an alkyl group may also be substituted with an aryl or heteroaryl group. An aryl or heteroaryl group may also be substituted with alkyl or alkoxy. Exemplary substituted aryl groups include methylphenyl and methoxyphenyl. Exemplary substituted heteroaryl groups include 3-methylthienyl.

Generally, the alkyl groups independently contain from 1 to 30 carbon atoms. Similarly, the aryl groups independently contain from 6 to 30 carbon atoms. The heteroaryl groups contain from 2 to 30 carbon atoms.

Other specific exemplary alkyl groups include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, cyclopentyl, cyclohexyl, cycloheptyl, and isomers thereof.

Other specific exemplary aryl and substituted aryl groups include phenyl, polyphenyl, and naphthyl; alkoxyphenyl groups, such as p-methoxyphenyl, m-methoxyphenyl, o-methoxyphenyl, ethoxyphenyl, p-tert-butoxyphenyl, and m-tert-butoxyphenyl; alkylphenyl groups such as 2-methylphenyl, 3-methylphenyl, 4-methylphenyl, ethylphenyl, 4-tert-butylphenyl, 4-butylphenyl, and dimethylphenyl; alkylnaphthyl groups such as methylnaphthyl and ethylnaphthyl; alkoxynaphthyl groups such as methoxynaphthyl and ethoxynaphthyl; dialkylnaphthyl groups such as dimethylnaphthyl and diethylnaphthyl; and dialkoxynaphthyl groups such as dimethoxynaphthyl and diethoxynaphthyl, other aryl groups listed as exemplary M groups, and combinations thereof.

Other specific exemplary heteroaryl groups include oxazole, isoxazole, pyridine, thiazole, isothiazole, imidazole, triazole, pyrazole, furazan, thiadiazole, oxadiazole, pyridazine, pyrimidine, pyrazine, indole, isoindole, indazole, chromene, quinoline, isoquinoline, cinnoline, quinazoline, quinoxaline, naphthylidine, phthalazine, purine, pteridine, thienofuran, imidazothiazole, benzofuran, benzothiophene, benzoxazole, benzthiazole, benzthiadiazole, benzimidazole, imidazopyridine, pyrrolopyridine, pyrrolopyrimidine, pyridopyrimidine, and combinations thereof.

Each Ar$_1$ and Ar$_2$ unit may be independently selected from the group consisting of:

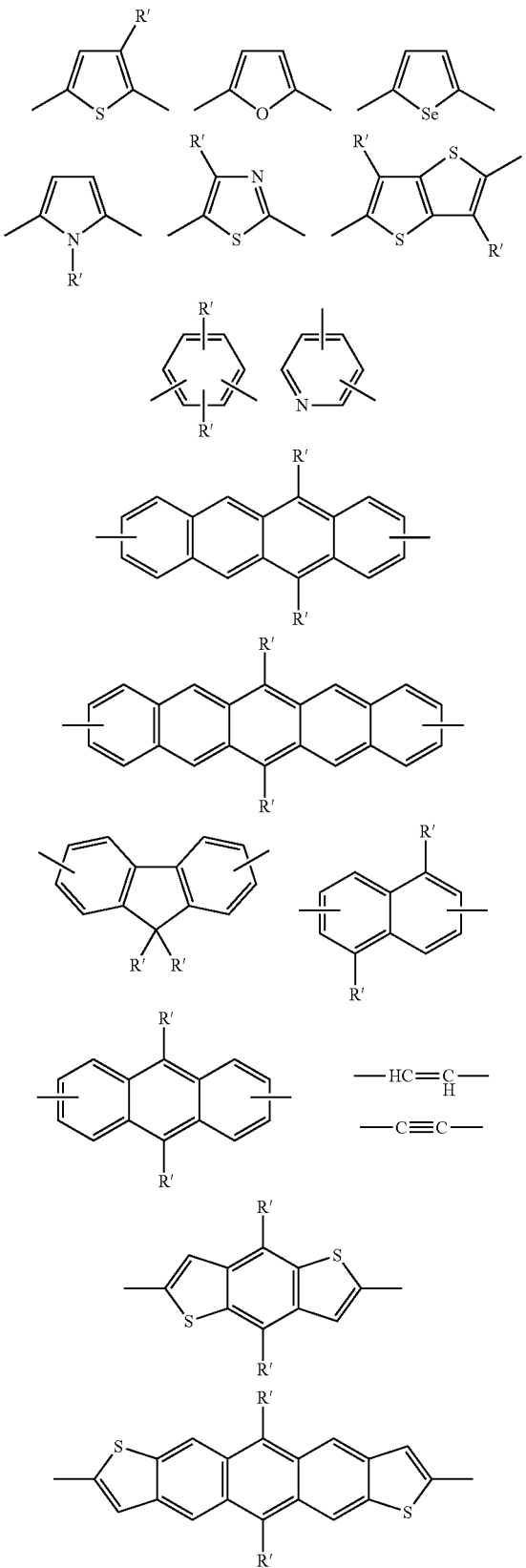

17
-continued

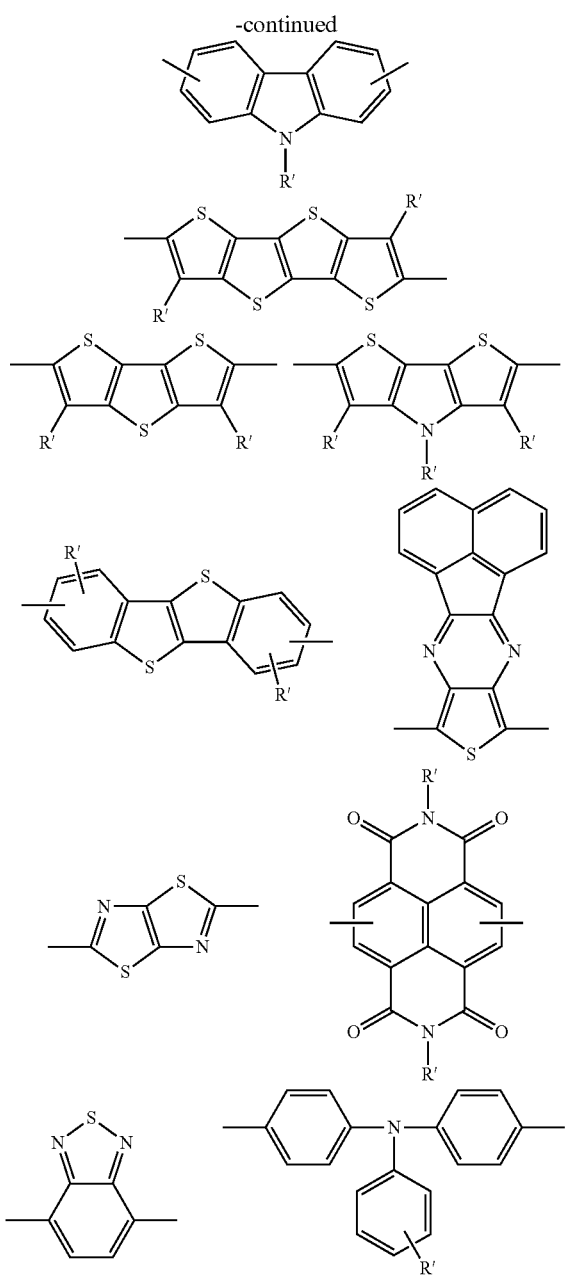

and combinations thereof, wherein R' is independently selected from hydrogen, alkyl, substituted alkyl, aryl, substituted aryl, heteroaryl, substituted heteroaryl, halogen, alkoxy, alkylthio, trialkylsilyl, —CN, or —NO$_2$.

The term "alkoxy" refers to an alkyl radical which is attached to an oxygen atom, e.g. —O—C$_n$H$_{2n+1}$. The oxygen atom attaches to the core of the compound.

The term "alkylthio" refers to an alkyl radical which is attached to a sulfur atom, e.g. —S—C$_n$H$_{2n+1}$. The sulfur atom attaches to the core of the compound.

The term "trialkylsilyl" refers to a radical composed of a tetravalent silicon atom having three alkyl radicals attached to the silicon atom, i.e. —Si(R)$_3$. The three alkyl radicals may be the same or different. The silicon atom attaches to the core of the compound.

In particular embodiments, one of the Ar$_1$ and Ar$_2$ units is a thieno[3,2-b]thiophene unit. A thiophene unit is also particularly desirable in the polymer of Formula (I).

The polymer may have the structure of Formula (II):

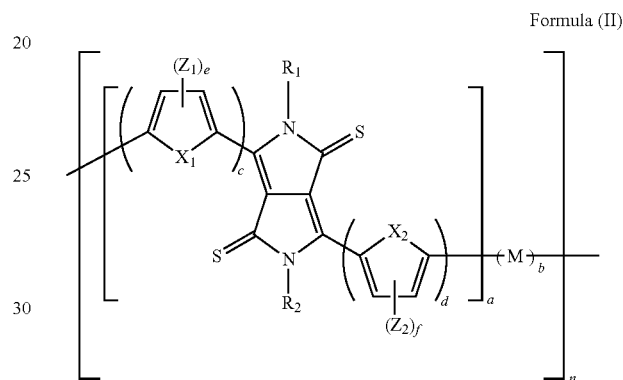

Formula (II)

wherein R$_1$ and R$_2$ are independently hydrogen, alkyl, substituted alkyl, heteroaryl, substituted aryl, or substituted heteroaryl; X$_1$ and X$_2$ are independently S, Se, O, or NR", wherein each R" can independently be hydrogen or alkyl; each Z$_1$ and Z$_2$ is independently alkyl, substituted alkyl, aryl, substituted aryl, heteroaryl, substituted heteroaryl, halogen, alkoxy, alkylthio, trialkylsilyl, —CN, or —NO$_2$; M is a conjugated moiety; a, c, and d are independently at least 1; b is from 0 to about 20; e and f are independently from 0 to 2; and n is from 2 to about 5,000.

The M group can be any group discussed above for the Ar$_1$ and Ar$_2$ groups. In preferred embodiments, M is a conjugated moiety containing from about 4 to about 30 carbon atoms.

In more specific embodiments, a is 1. In other embodiments, c and d are independently 1 or 2. In particular embodiments, M is 1.

Exemplary semiconducting polymers of Formula (I) or Formula (II) include those of Formulas (1)-(20):

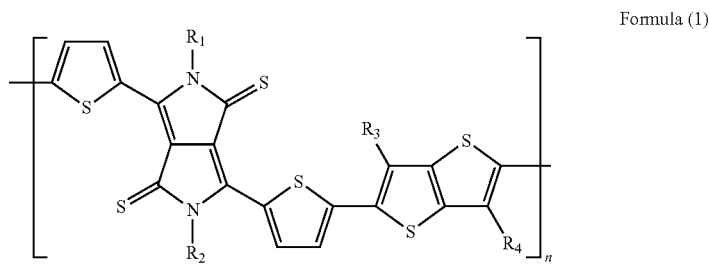

Formula (1)

-continued
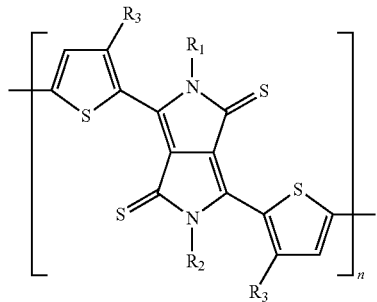
Formula (2)
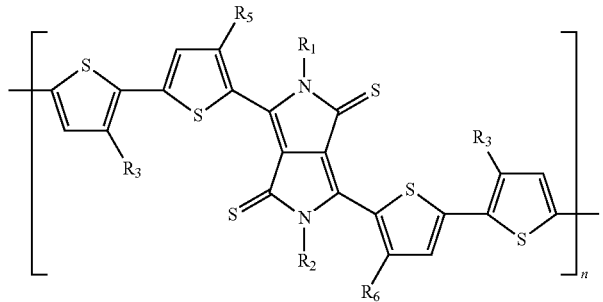
Formula (3)
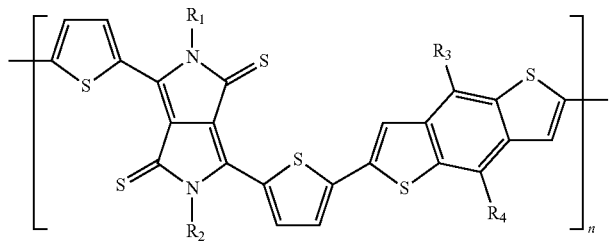
Formula (4)
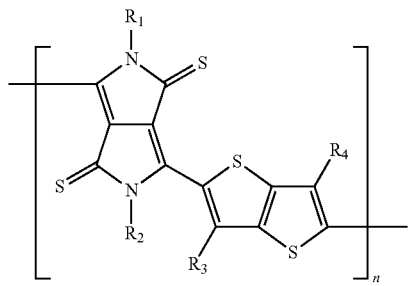
Formula (5)
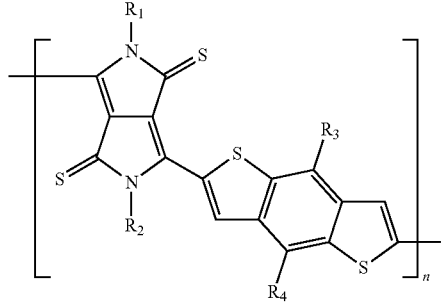
Formula (6)

-continued
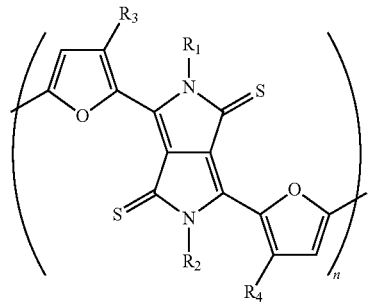
Formula (7)
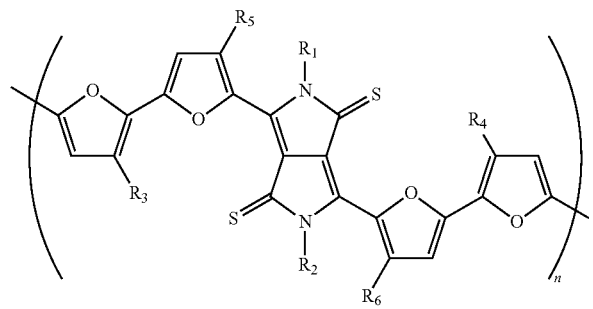
Formula (8)
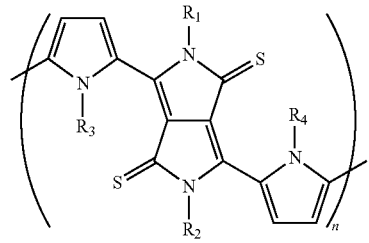
Formula (9)
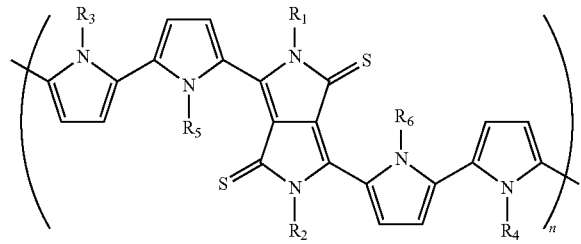
Formula (10)
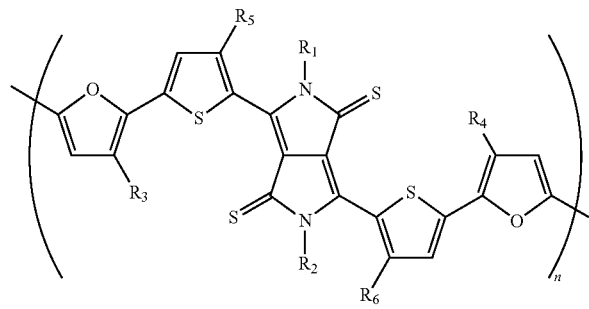
Formula (11)

-continued
Formula (12)
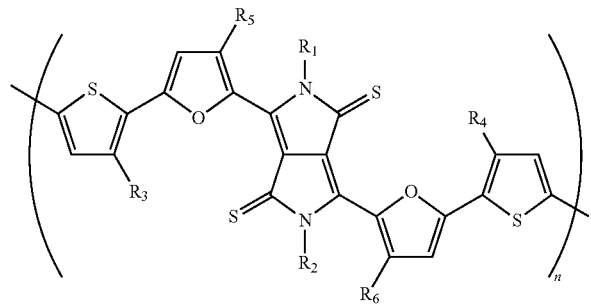
Formula (13)
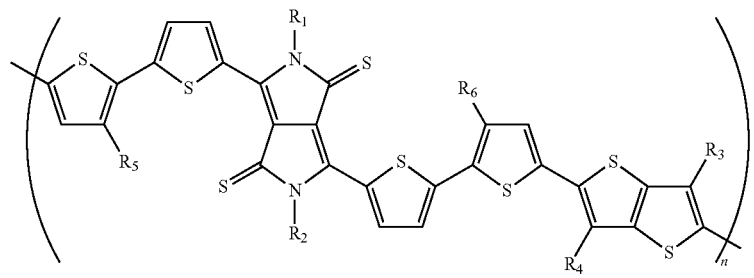
Formula (14)
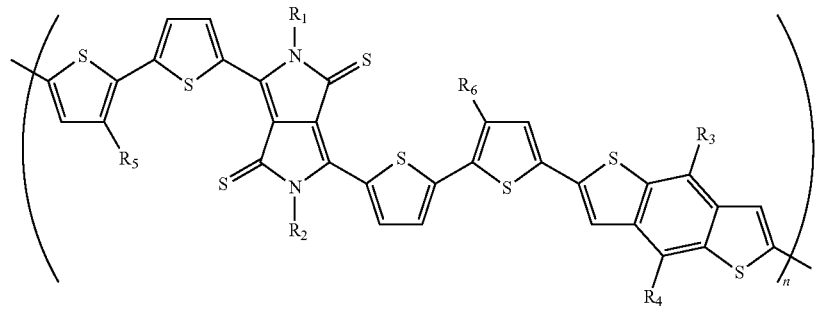
Formula (15)
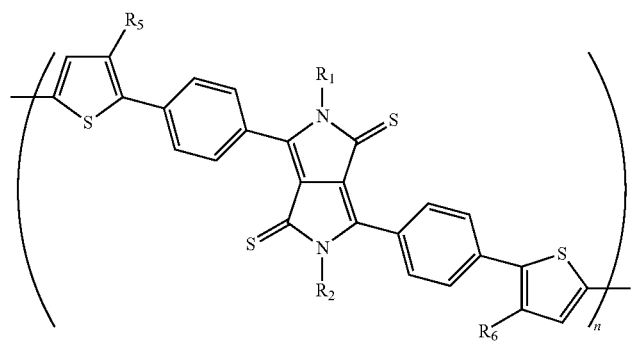
Formula (16)
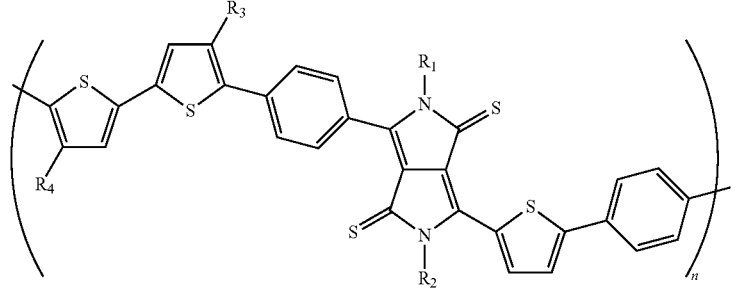

Formula (17)

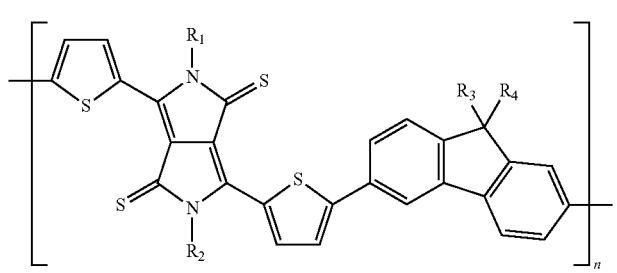

Formula (18)

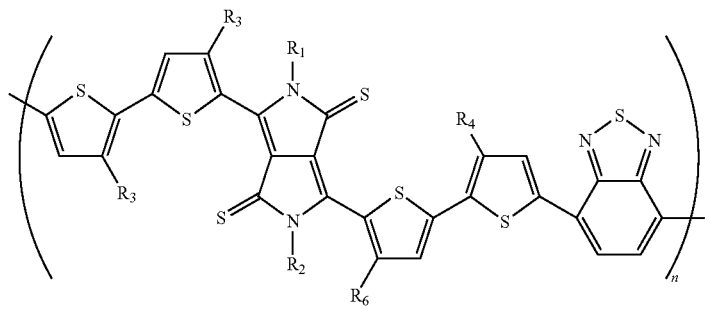

Formula (19)

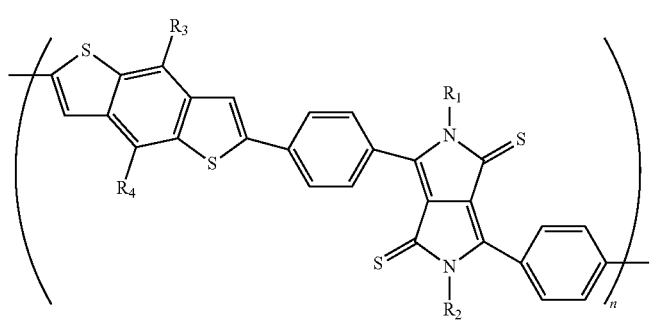

Formula (20)

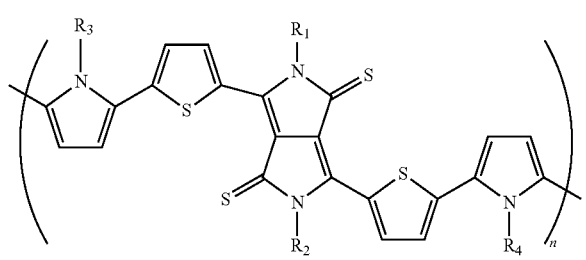

wherein $R_1$ and $R_2$ are independently hydrogen, alkyl, substituted alkyl, aryl, or substituted aryl; $R_3$, $R_4$, $R_5$, and $R_6$ are independently hydrogen, alkyl, substituted alkyl, aryl, substituted aryl, heteroaryl, substituted heteroaryl, halogen, alkoxy, alkylthio, trialkylsilyl, —CN, or —NO$_2$; and n is from 2 to about 5,000. In some embodiments of these Formulas, at least one of $R_1$, $R_2$, $R_3$, $R_4$, $R_5$, and $R_6$ is not hydrogen.

The polymers of Formulas (1)-(20) are all examples of the polymer of Formula (I). The polymers of Formulas (1), (2), (3), (4), (7), (8), (9), (10), (11), (12), (13), (14), (17), (18), and (20) are examples of the polymer of Formula (II).

In embodiments, the semiconductor polymer of Formula (I) has a band gap of from about 1.1 to about 3.2 eV, including from about 1.2 to about 2.8 eV, or from about 1.2 to about 2.0 eV. In some embodiments, the semiconductor polymer of Formula (I) has a small band gap from about 1.0 to about 2.0 eV. This small band gap is a result of weak donor and acceptor effects of the repeating units. The dithioketopyrrolopyroole unit is an electron accepting moiety, while most of the $Ar_1$ and $Ar_2$ moieties discussed above are electron donating moieties. This combination of electron donors and electron acceptors will result in a small band gap, yet the polymer has very good stability. The semiconductor polymer has a crystalline, semi-crystalline, or liquid crystalline structure in the semiconductor layer. Crystallinity can be determined for example using X-ray diffraction method.

Figure 5:
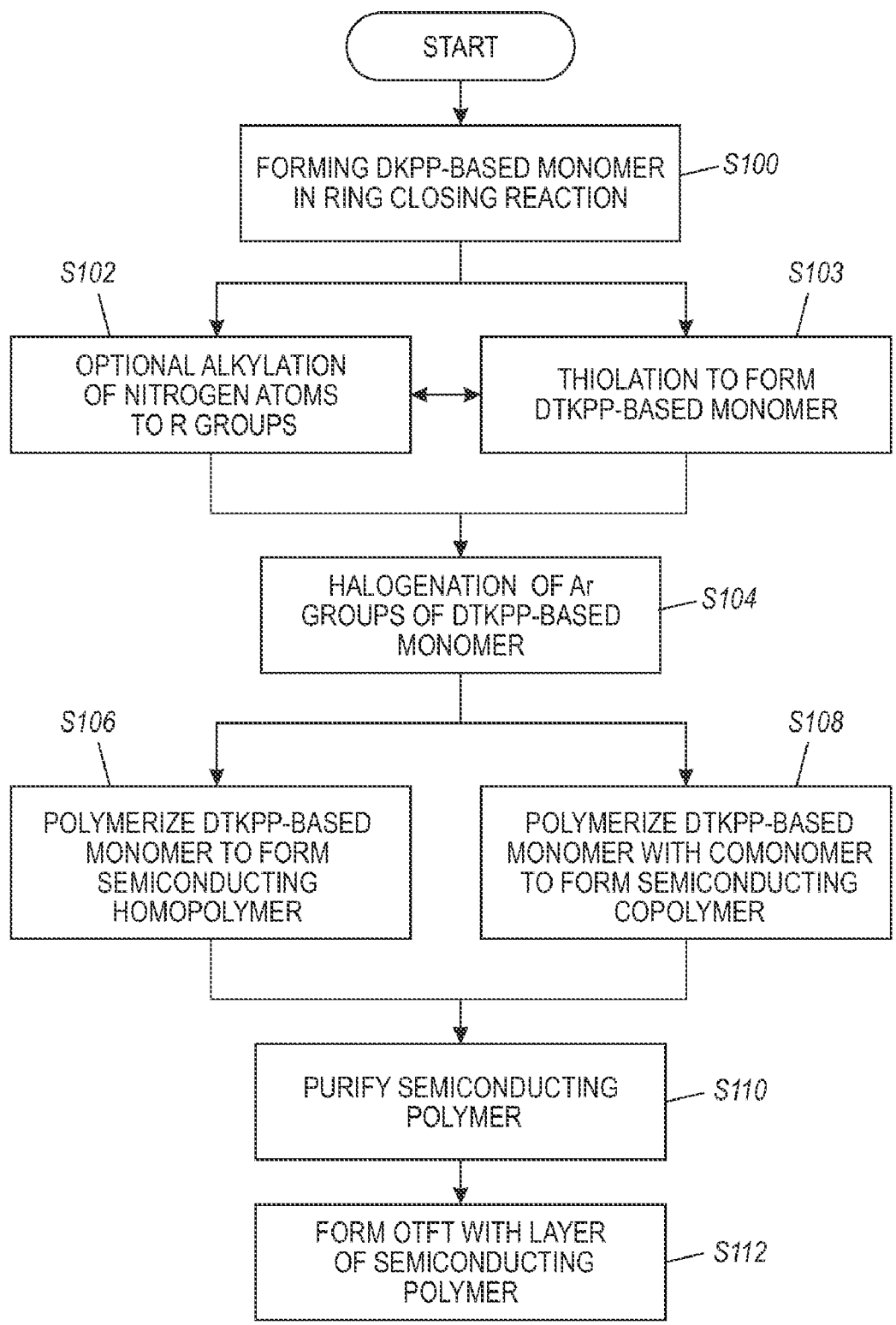
FIG. 5 is a flow chart for an exemplary method of forming a polymer layer in accordance with the disclosure.

Exemplary polymers of the present prepared by a five-step process, as illustrated in FIG. 5.

At step S100, a DKPP (diketopyrrolopyrrole)moiety may be formed by reacting 2 moles of an appropriate nitrile or a Schiff base with one mole of a succinic acid diester in the presence of a base and an organic solvent. For example, a carbonitrile (Ar—CN) for forming the selected Ar group (e.g., thiophenecarbonitrile) is reacted with a succinate (e.g. diisopropyl succinate or di-n-butyl succinate) under suitable conditions for ring closure of the DKPP moiety to form a monomer M1 of the general formula:

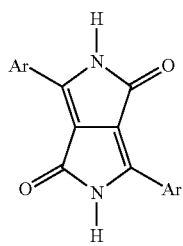

M1 where Ar is as defined above.

For example, step S100 may be carried out in solution in the presence of a sodium alkoxide, such as t-$C_5H_{11}$ONa, which may be formed in situ, followed by neutralization with an organic acid, such as glacial acetic acid. The reaction may be performed at a suitable reaction temperature, such as about 85° C.

At step S102, the H groups on the nitrogen atoms of the monomer (M1) obtained at step S100 may optionally be converted from H to a selected R group by reaction of the monomer with a halide of the formula R—Y, where R is as defined above (other than H) and Y is a halogen which may be selected from chlorine, bromine, and iodine. A monomer of the following structure (M2) is thus formed:

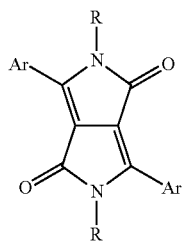

M2

When R is aryl, substituted aryl, heteroaryl, or substituted heteroaryl, an optional palladium or copper catalyst may be required.

Step S102 may be performed in solution at a suitable reaction temperature, such as about 40 to 180° C. (e.g., about 120° C.). The reaction may be carried out in a suitable solvent, such as dimethylformamide, in the presence of an appropriate base, such as an alkali metal hydroxide or carbonate and a crown ether, such as 18-crown-6. Suitable bases include NaH, NaOH, KOH, t-BuONa, t-BuOK, $Na_2CO_3$, $K_2CO_3$ and the like. Usually, the molar ratio of the base to compound M1 is chosen in the range of from 0.5:1 to 50:1.

At step S103, the monomer is thiolated to convert the carbonyl groups into thiocarbonyl groups and form a DTKPP (dithioketopyrrolopyrrole) moiety. This step may be performed, for example, using Lawesson's reagent.

It should be noted that the alkylation step S102 and thiolation step S103 can be reversed in order. Again, the alkylation step is optional. After these two steps, the monomer M3 is formed:

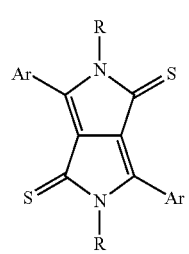

(M3)

where the R in M3 can be hydrogen, alkyl, substituted alkyl, aryl, or substituted aryl (depending on whether the alkylation step was performed and the choice of the R group in the alkylation).

At step S104, the Ar groups are halogenated with a halogenating reagent, such as N-halosuccinimides, bromine, chlorine, or iodine, to form a monomer of the general formula:

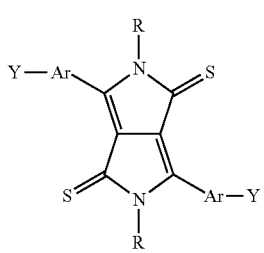

(M4)

Y can be a halogen, such as bromine, chlorine, or iodine. Step S104 may be carried out in any suitable non-reactive medium, such as chloroform, e.g., at room temperature or above.

Figure 6:
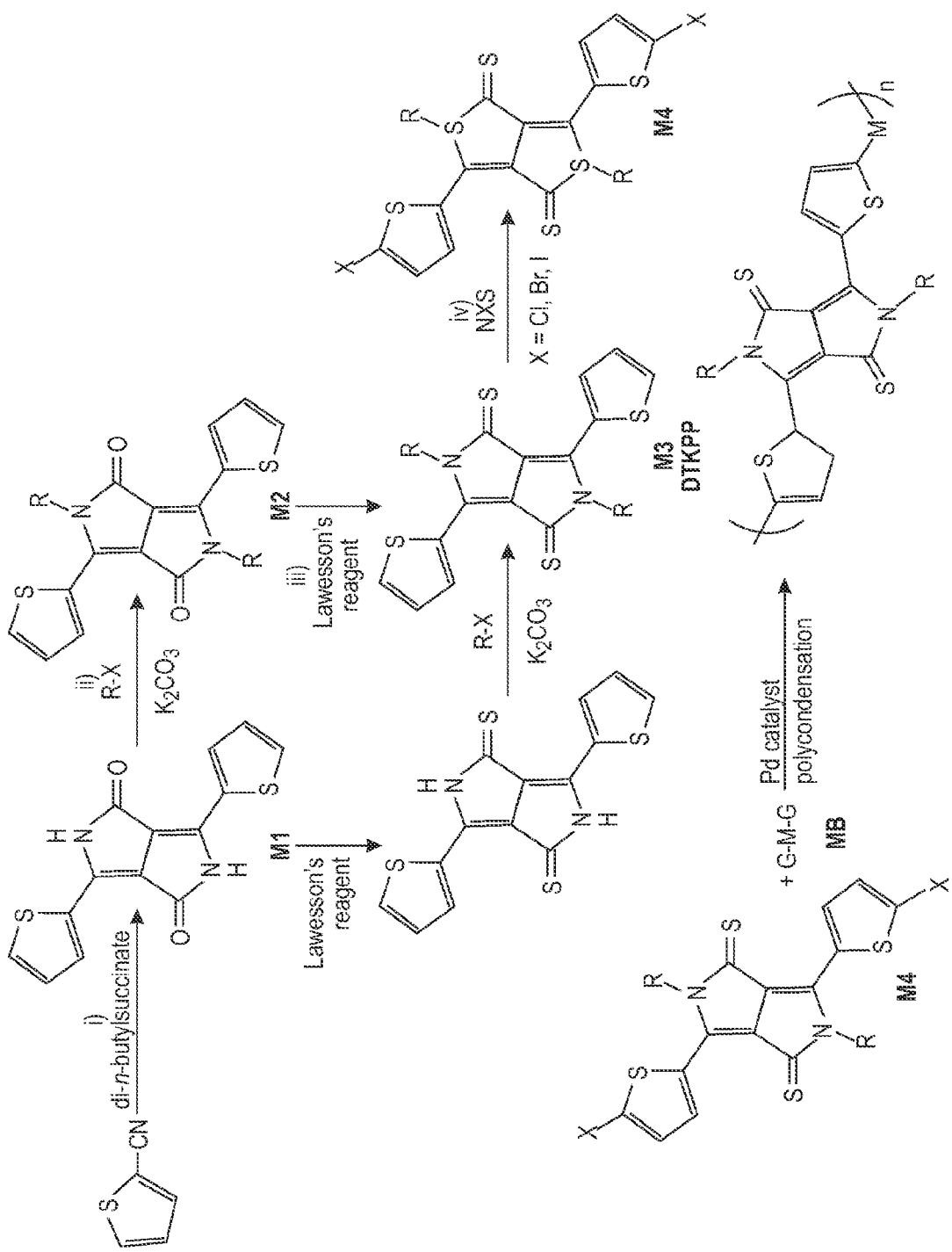
FIG. 6 is a flow chart illustrating an exemplary synthesis of a polymer of Formula (I).

FIG. 6 illustrates the synthesis of an exemplary DTKPP monomer of Formula (I) where $Ar_1$ and $Ar_2$ are thiophene groups.

Continuing with step S106, the monomer (M4) can be polymerized to form a homopolymer of Formula (I) where p and q are each 1.

Alternatively, at step S108, the monomer (M4) may be copolymerized with a comonomer MB for forming polymers of Formula (II), wherein the comonomer provides the conjugated moiety M in Formula (II). Suitable conjugated moieties include those listed above for $Ar_1$ and $Ar_2$, such as thiophene, furan, pyrrole, thieno[3,2-b]thiophene, benzo[1,2-b:4,5-b'] dithiophene, and combinations thereof.

Step S106 or S108 may be performed in solution in the presence of a di-tin compound, such as an hexaalkyl-di-tin or hexaaryl-di-tin compound such as hexamethylditin, hexa-n-butylditin, or hexaphenylditin, and a catalyst suitable for coupling reactions or for polycondensation reactions, optionally in the presence of copper(I) iodide. A suitable coupling catalyst is a palladium-based catalyst, e.g., a tetrakis(triarylphosphonium)-palladium catalyst, such as tetrakis(triphenylphosphine)palladium(0) (Pd(PPh$_3$)$_4$), Pd(PPh$_3$)$_2$Cl$_2$, PdOAc$_2$, Pd(dba)$_3$:P(o-Tol)$_3$, or derivatives thereof. Usually, the catalyst is added in a molar ratio of DTKPP monomer to the catalyst in the range of from about 1000:1 to about 10:1, e.g., from about 100:1 to about 30:1. A suitable solvent for the reaction may be a mixture of THF and 1-methyl-2-pyrrolidinone (NMP). The reaction may be carried out under reflux at a temperature which is at or slightly above the boiling point of the solvent.

For example, the comonomer MB has the formula G-M-G, where M is the conjugated moiety and G is a reactive group that depends on the polycondensation reaction. For example, in a Suzuki reaction, the reactive group G may be one of those shown below:

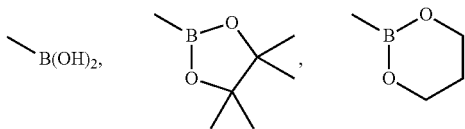

An additional base, such as $K_2CO_3$, $Cs_2CO_3$, $K_3PO_4$, KF, or CsF, is also required for a Suzuki reaction. Alternatively, in a Stille reaction, the reactive group G is a trialkylstannyl group such as —$SnMe_3$ or —$Sn(n-Bu)_3$. FIG. 6 also shows the reaction of monomer M4 with comonomer MB to form a polymer (i.e. step S108).

At S110, the resulting polymer may be purified, e.g., by Soxhlet extraction.

The polymers/copolymers thus formed may have a weight average molecular weight NA, in the range of from about 700 to about 1,000,000. In some embodiments, the polymer of Formula (I) has a $M_w$ of about 1,000 to about 800,000, including from about 2,000 to about 500,000.

At S112, a layer comprising the polymer may be incorporated into a semiconductor device.

Semiconductor compositions comprising the semiconductor polymers are also disclosed. The semiconductor compositions may include a solvent in which the polymer is soluble. Exemplary solvents used in the solution may include chlorinated solvents such as chlorobenzene, chlorotoluene, dichlorobenzene, dichloroethane, and the like; alcohols and diols such as propanol, butanol, hexanol, hexanediol, etc.; hydrocarbons or aromatic hydrocarbons such as hexane, heptane, toluene, xylene, mesitylene, trimethyl benzene, ethyl benzene, tetrahydronaphthalene, decalin, methyl naphthalene, etc.; ketones such as acetone, methyl ethyl ketone, etc.; acetates, such as ethyl acetate; pyridine, tetrahydrofuran, and the like.

In embodiments, the semiconductor composition comprising the semiconductor polymer of Formula (I) may have a viscosity of from about 1.5 centipoise (cps) to about 1000 cps, including from about 2 to about 100 cps, or from about 2 to about 20 cps.

The semiconductor polymer can be present in semiconducting layer of any electronic devices, for example, thin film transistors, photovoltaic, light emitting diodes, light emitting transistors, sensors, and the like. In embodiment, the semiconductor polymer could be used to form a layer of thin film transistor or photovoltaic devices.

The semiconducting layer may be formed in an electronic device using conventional processes known in the art. In embodiments, the semiconducting layer is formed using solution depositing techniques. Exemplary solution depositing techniques include spin coating, blade coating, rod coating, dip coating, screen printing, ink jet printing, stamping, stencil printing, screen printing, gravure printing, flexography printing, and the like.

The semiconducting layer formed using the semiconductor composition can be from about 5 nanometers to about 1000 nanometers deep, including from about 20 to about 100 nanometers in depth. In certain configurations, such as the configurations shown in FIGS. 1 and 4, the semiconducting layer completely covers the source and drain electrodes. The semiconductor channel width may be, for example, from about 5 micrometers to about 5 millimeters with a specific channel width being about 100 micrometers to about 1 millimeter. The semiconductor channel length may be, for example, from about 1 micrometer to about 1 millimeter with a more specific channel length being from about 5 micrometers to about 100 micrometers.

The performance of a TFT can be measured by mobility. The mobility is measured in units of $cm^2/V \cdot sec$; higher mobility is desired. The resulting TFT using the semiconductor composition of the present disclosure may have a field effect mobility of at least 0.01 $cm^2/V \cdot sec$. The TFT of the present disclosure may have a current on/off ratio of at least $10^3$.

A thin film transistor generally includes a substrate, an optional gate electrode, source electrode, drain electrode, and a dielectric layer in addition to the semiconducting layer.

The substrate may be composed of materials including but not limited to silicon, glass plate, plastic film or sheet. For structurally flexible devices, plastic substrate, such as for example polyester, polycarbonate, polyimide sheets and the like may be preferred. The thickness of the substrate may be from about 10 micrometers to over 10 millimeters with an exemplary thickness being from about 50 to about 100 micrometers, especially for a flexible plastic substrate and from about 0.5 to about 10 millimeters for a rigid substrate such as glass or silicon.

The dielectric layer generally can be an inorganic material film, an organic polymer film, or an organic-inorganic composite film. Examples of inorganic materials suitable as the dielectric layer include silicon oxide, silicon nitride, aluminum oxide, barium titanate, barium zirconium titanate and the like. Examples of suitable organic polymers include polyesters, polycarbonates, poly(vinyl phenol), polyimides, polystyrene, polymethacrylates, polyacrylates, epoxy resin and the like. The thickness of the dielectric layer depends on the dielectric constant of the material used and can be, for example, from about 10 nanometers to about 500 nanometers. The dielectric layer may have a conductivity that is, for example, less than about $10^{-12}$ Siemens per centimeter (S/cm). The dielectric layer is formed using conventional processes known in the art, including those processes described in forming the gate electrode.

In the present disclosure, the dielectric layer may be surface modified with a surface modifier. Exemplary surface modifiers include organosilanes such as hexamethyldisilazane (HMDS), octyltrichlorosilane (OTS-8), octadecyltrichlorosilane (ODTS-18), and phenyltrichlorosilane (PTS). The semiconducting layer can be directly contacted with this modified dielectric layer surface. The contact may be complete or partial. This surface modification can also be considered as forming an interfacial layer between the dielectric layer and the semiconducting layer.

The gate electrode is composed of an electrically conductive material. It can be a thin metal film, a conducting polymer film, a conducting film made from conducting ink or paste, or the substrate itself, for example heavily doped silicon. Examples of gate electrode materials include but are not restricted to aluminum, gold, silver, chromium, indium tin oxide, conductive polymers such as polystyrene sulfonate-doped poly(3,4-ethylenedioxythiophene) (PSS-PEDOT), and conducting ink/paste comprised of carbon black/graphite. The gate electrode can be prepared by vacuum evaporation, sputtering of metals or conductive metal oxides, conventional lithography and etching, chemical vapor deposition, spin coating, casting or printing, or other deposition processes. The thickness of the gate electrode ranges for example from about 10 to about 200 nanometers for metal films and from about 1 to about 10 micrometers for conductive polymers. Typical materials suitable for use as source and drain electrodes include those of the gate electrode materials such as aluminum, gold, silver, chromium, zinc, indium, conductive metal oxides such as zinc-gallium oxide, indium tin oxide, indium-antimony oxide, conducting polymers and conducting inks. Typical thicknesses of source and drain electrodes are, for example, from about 40 nanometers to about 1 micrometer, including more specific thicknesses of from about 100 to about 400 nanometers.

Typical materials suitable for use as source and drain electrodes include those of the gate electrode materials such as gold, silver, nickel, aluminum, platinum, conducting polymers, and conducting inks. In specific embodiments, the electrode materials provide low contact resistance to the semiconductor. Typical thicknesses are about, for example, from about 40 nanometers to about 1 micrometer with a more specific thickness being about 100 to about 400 nanometers.

The source electrode is grounded and a bias voltage of, for example, about 0 volt to about 80 volts is applied to the drain electrode to collect the charge carriers transported across the semiconductor channel when a voltage of, for example, about +10 volts to about −80 volts is applied to the gate electrode. The electrodes may be formed or deposited using conventional processes known in the art.

If desired, a barrier layer may also be deposited on top of the TFT to protect it from environmental conditions, such as light, oxygen and moisture, etc. which can degrade its electrical properties. Such barrier layers are known in the art and may simply consist of polymers.

The various components of the OTFT may be deposited upon the substrate in any order. Generally, however, the gate electrode and the semiconducting layer should both be in contact with the gate dielectric layer. In addition, the source and drain electrodes should both be in contact with the semiconducting layer. The phrase "in any order" includes sequential and simultaneous formation. For example, the source electrode and the drain electrode can be formed simultaneously or sequentially. The term "on" or "upon" the substrate refers to the various layers and components with reference to the substrate as being the bottom or support for the layers and components which are on top of it. In other words, all of the components are on the substrate, even though they do not all directly contact the substrate. For example, both the dielectric layer and the semiconducting layer are on the substrate, even though one layer is closer to the substrate than the other layer. The resulting TFT has good mobility and good current on/off ratio.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A polymer of Formula (I):

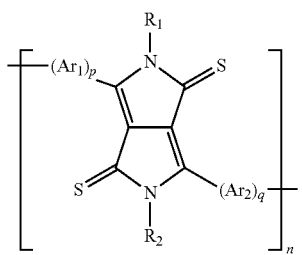

Formula (I)

wherein $R_1$ and $R_2$ are independently hydrogen, alkyl, substituted alkyl, aryl, or substituted aryl; p and q are the number of $Ar_1$ and $Ar_2$ units and are independently from 1 to about 25; wherein n is the number of repeating units and is from 2 to about 5,000; and wherein each $Ar_1$ and $Ar_2$ unit is independently selected from the group consisting of:

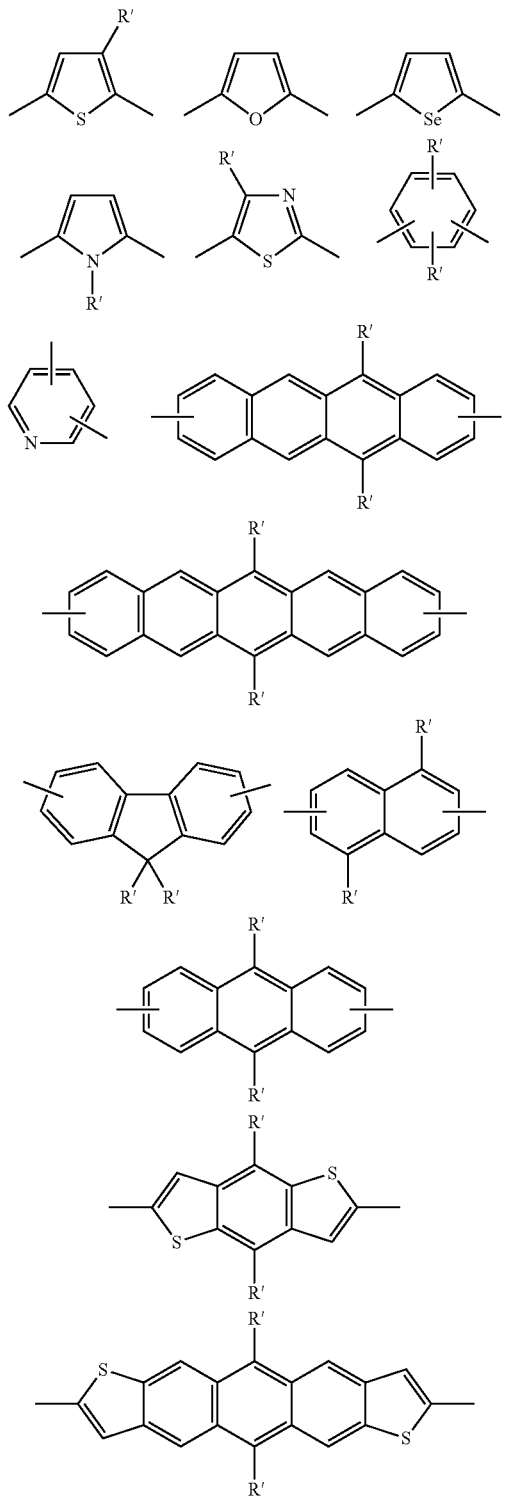

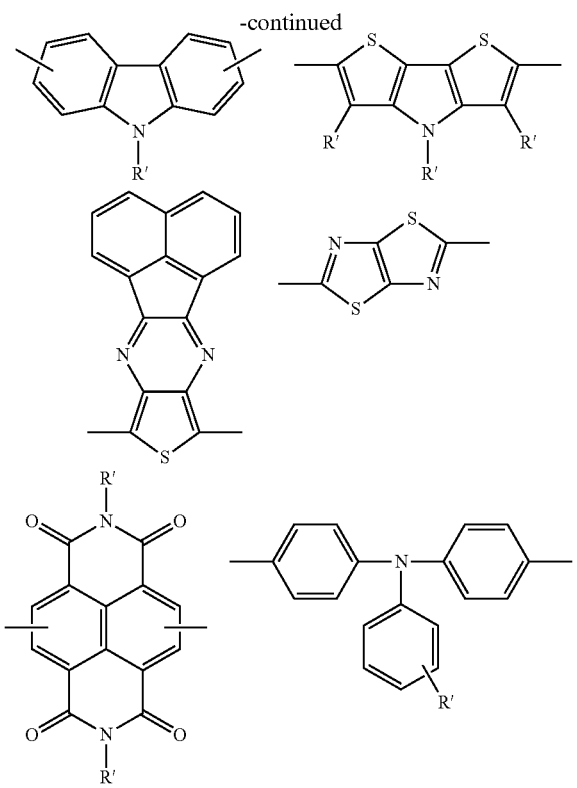

and combinations thereof, wherein R' is independently selected from hydrogen, alkyl, substituted alkyl, aryl, substituted aryl, heteroaryl, substituted heteroaryl, halogen, alkoxy, alkylthio, trialkylsilyl, —CN, or —NO$_2$.

2. The polymer of claim 1, wherein R$_1$ and R$_2$ are alkyl.

3. The polymer of claim 1, having the structure of Formula (II):

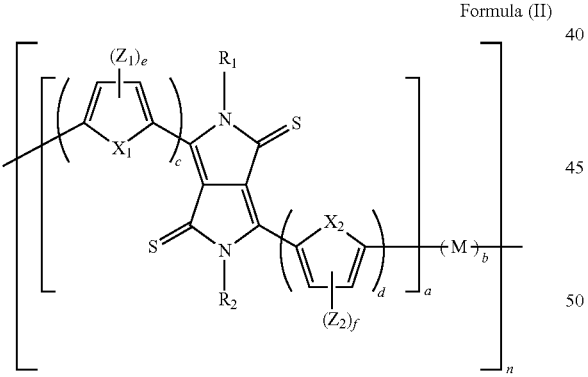

wherein R$_1$ and R$_2$ are independently hydrogen, alkyl, substituted alkyl, heteroaryl, substituted aryl, or substituted heteroaryl;

X$_1$ and X$_2$ are independently S, Se, O, or NR", wherein each R" can independently be hydrogen or alkyl;

each Z$_1$ and Z$_2$ is independently alkyl, substituted alkyl, aryl, substituted aryl, heteroaryl, substituted heteroaryl, halogen, alkoxy, alkylthio, trialkylsilyl, —CN, or —NO$_2$;

M is a conjugated moiety;

a, c, and d are independently at least 1;

b is 0;

e and f are independently from 0 to 2; and n is from 2 to about 5,000.

4. The polymer of claim 3, wherein R$_1$ and R$_2$ are alkyl.

5. A semiconductor composition comprising a semiconductor polymer of Formula (I):

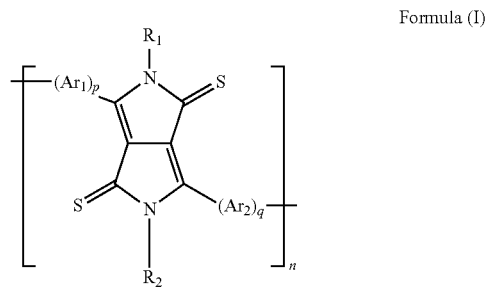

wherein R$_1$ and R$_2$ are independently hydrogen, alkyl, substituted alkyl, aryl, or substituted aryl; p and q are the number of Ar$_1$ and Ar$_2$ units and are independently from 1 to about 25; wherein n is the number of repeating units and is from 2 to about 5,000; and wherein each Ar$_1$ and Ar$_2$ unit is independently selected from the group consisting of:

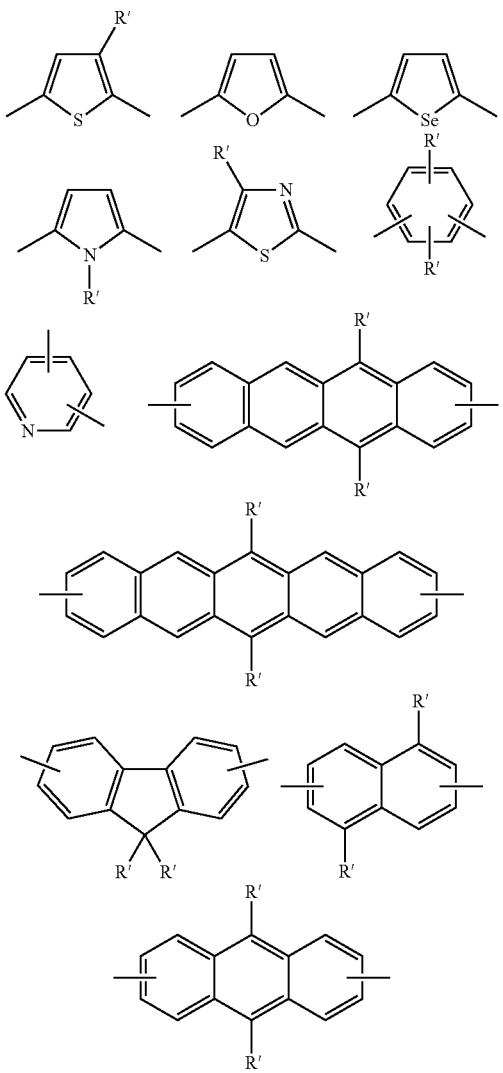

-continued

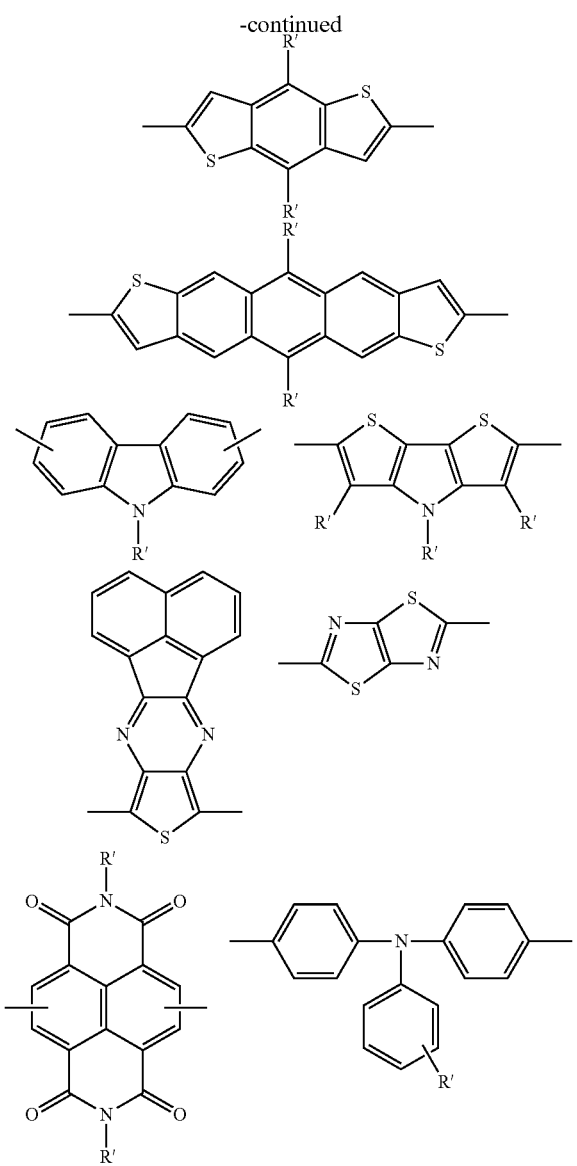

and combinations thereof, wherein R' is independently selected from hydrogen, alkyl, substituted alkyl, aryl, substituted aryl, heteroaryl, substituted heteroaryl, halogen, alkoxy, alkylthio, trialkylsilyl, —CN, or —NO$_2$.

6. The semiconductor composition of claim 5, wherein R$_1$ and R$_2$ are the same.

7. An electronic device comprising a semiconducting layer, the semiconducting layer comprising a polymer of Formula (I):

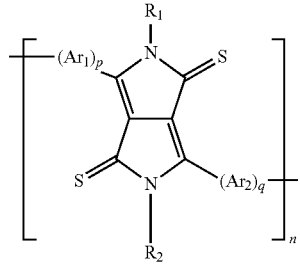

Formula (I)

wherein R$_1$ and R$_2$ are independently hydrogen, alkyl, substituted alkyl, aryl, or substituted aryl; p and q are the number of Ar$_1$ and Ar$_2$ units and are independently from 1 to about 25; wherein n is the number of repeating units and is from 2 to about 5,000; and wherein each Ar$_1$ and Ar$_2$ unit is independently selected from the group consisting of:

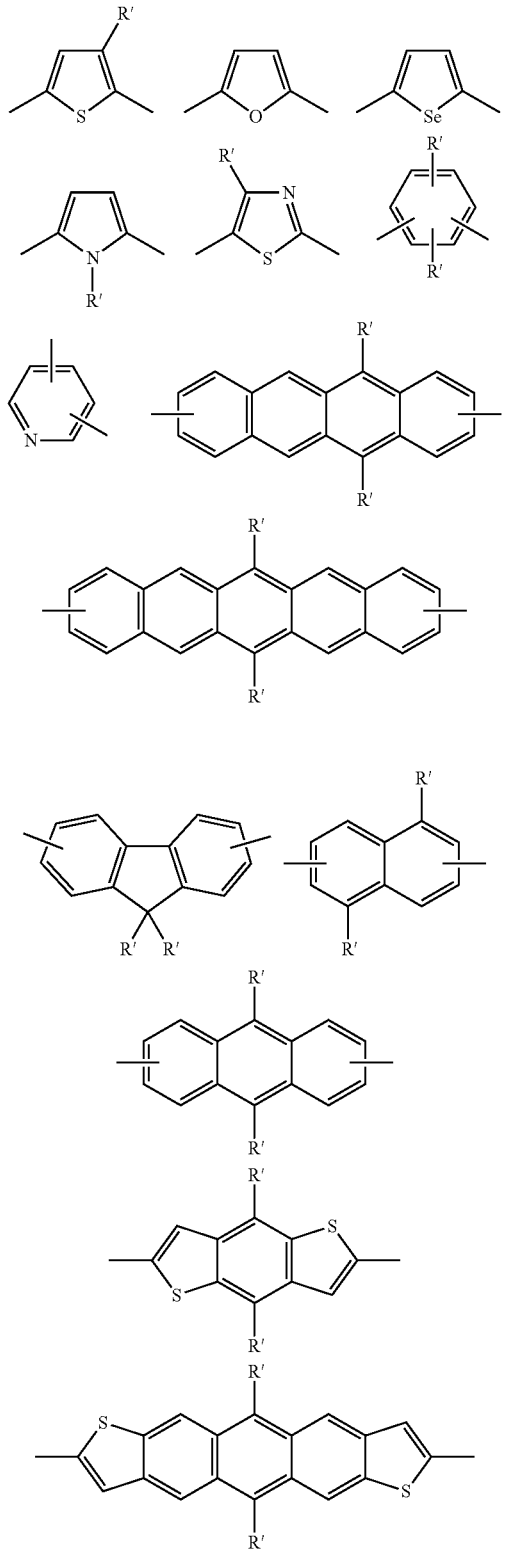

37
-continued

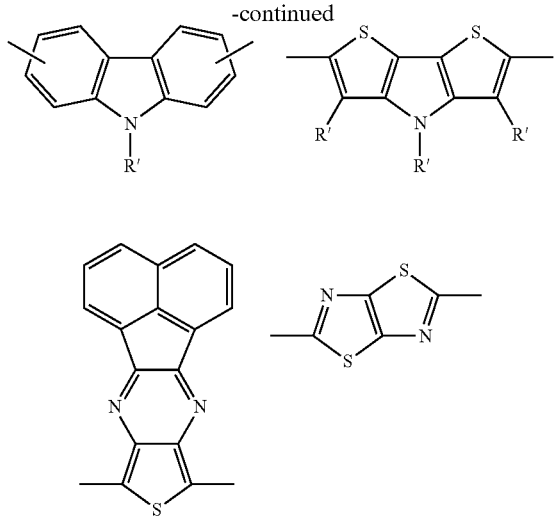

38
-continued

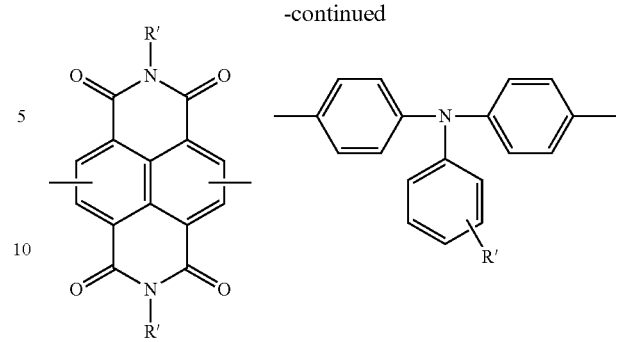

and combinations thereof, wherein R' is independently selected from hydrogen, alkyl, substituted alkyl, aryl, substituted aryl, heteroaryl, substituted heteroaryl, halogen, alkoxy, alkylthio, trialkylsilyl, —CN, or —NO$_2$.

8. The electronic device of claim 7, wherein $R_1$ and $R_2$ are the same.

9. The polymer of claim 3, wherein the polymer has the structure of one of Formulas (2), (3), (7), (8), (11), or (12):

Formula (2)

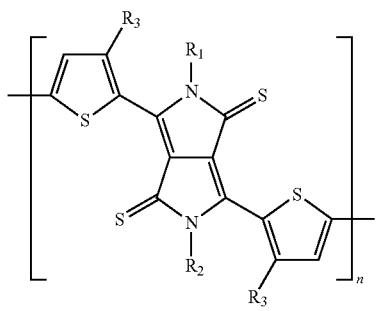

Formula (3)

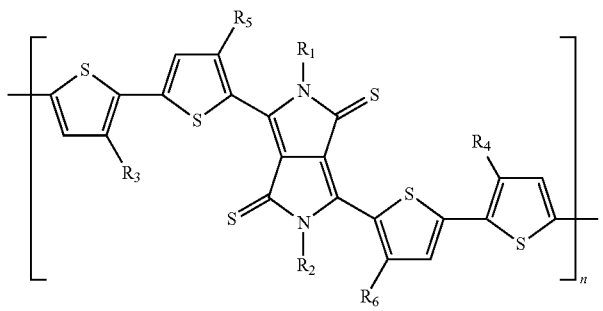

Formula (7)

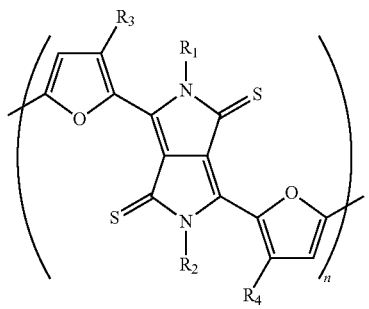

Formula (8)

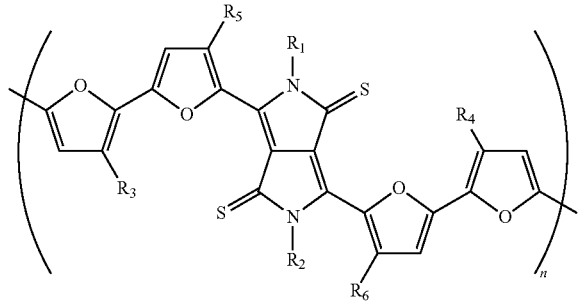

Formula (11)

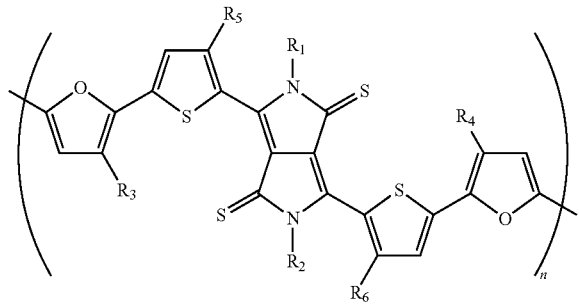

Formula (12)

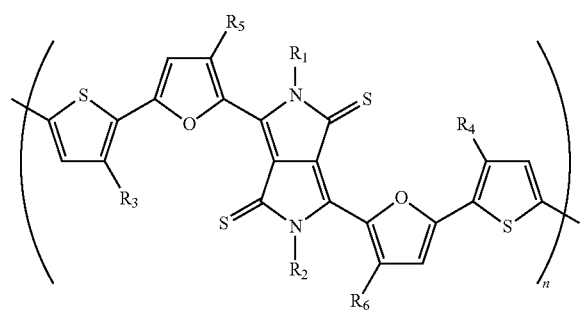

wherein $R_1$ and $R_2$ are independently hydrogen, alkyl, substituted alkyl, aryl, or substituted aryl;

$R_3$, $R_4$, $R_5$, and $R_6$ are independently hydrogen, alkyl, substituted alkyl, aryl, substituted aryl, heteroaryl, substituted heteroaryl, halogen, alkoxy, alkylthio, trialkylsilyl, —CN, or —NO$_2$; and n is from 2 to about 5,000.

10. The polymer of claim 3, wherein the polymer has the structure of one of Formulas (4), (6), (14), or (17):

Formula (4)

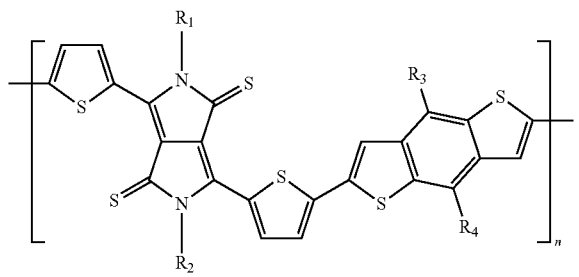

Formula (6)

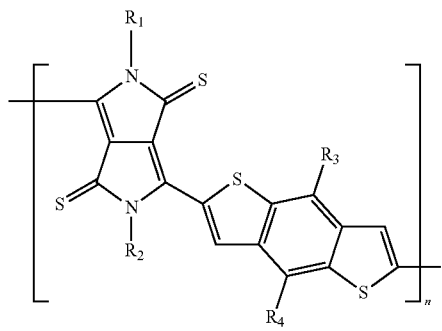

Formula (14)

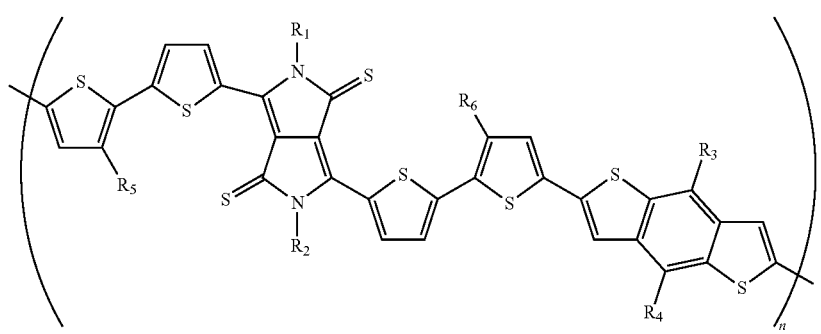

Formula (17)

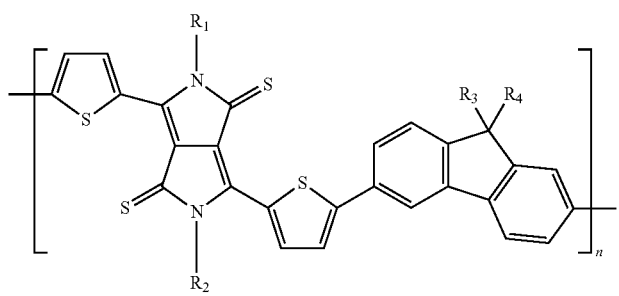

wherein $R_1$ and $R_2$ are independently hydrogen, alkyl, substituted alkyl, aryl, or substituted aryl;

$R_3$, $R_4$, $R_5$, and $R_6$ are independently hydrogen, alkyl, substituted alkyl, aryl, substituted aryl, heteroaryl, substituted heteroaryl, halogen, alkoxy, alkylthio, trialkylsilyl, —CN, or —NO$_2$; and n is from 2 to about 5,000.

11. The polymer of claim 3, wherein the polymer has the structure of one of Formulas (9), (10), or (20):

Formula (10)

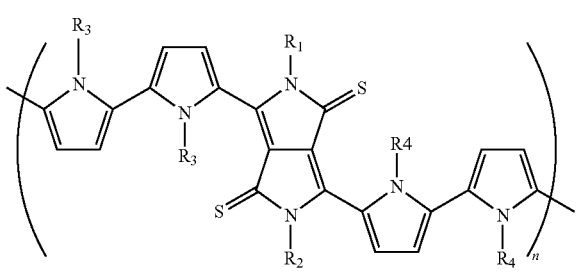

Formula (9)

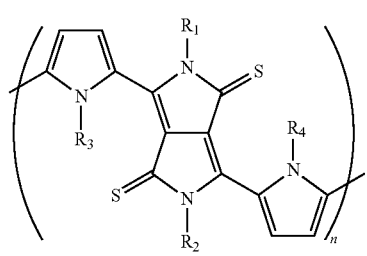

Formula (20)

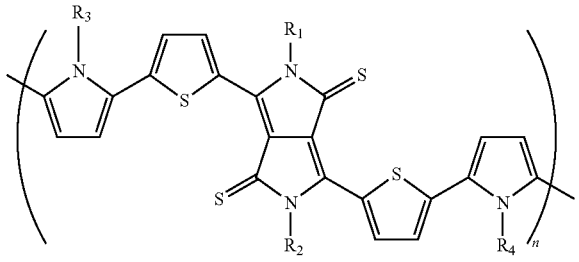

wherein $R_1$ and $R_2$ are independently hydrogen, alkyl, substituted alkyl, aryl, or substituted aryl;

$R_3$, $R_4$, $R_5$, and $R_6$ are independently hydrogen, alkyl, substituted alkyl, aryl, substituted aryl, heteroaryl, substituted heteroaryl, halogen, alkoxy, alkylthio, trialkylsilyl, —CN, or —NO$_2$; and n is from 2 to about 5,000.

12. The polymer of claim 3, wherein the polymer has the structure of one of Formulas (15), (16), or (19):

Formula (15)

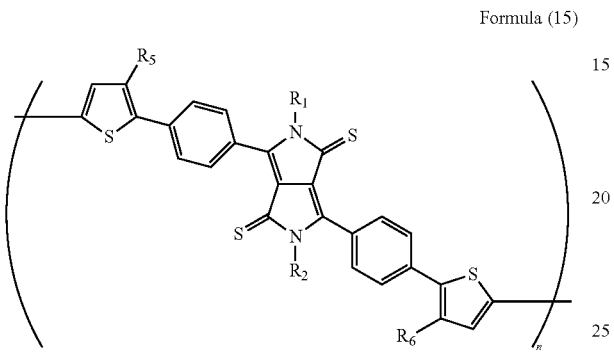

Formula (16)

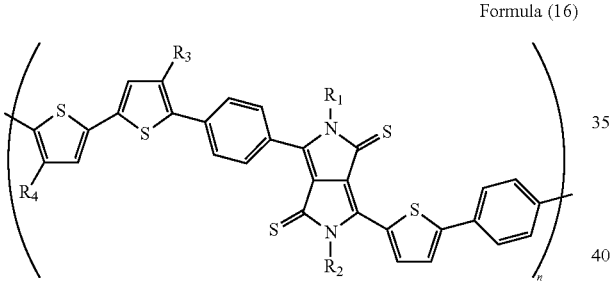

Formula (19)

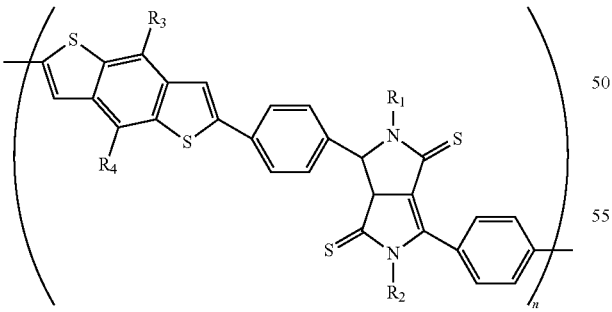

wherein $R_1$ and $R_2$ are independently hydrogen, alkyl, substituted alkyl, aryl, or substituted aryl;

$R_3$, $R_4$, $R_5$, and $R_6$ are independently hydrogen, alkyl, substituted alkyl, aryl, substituted aryl, heteroaryl, substituted heteroaryl, halogen, alkoxy, alkylthio, trialkylsilyl, —CN, or —NO$_2$; and n is from 2 to about 5,000.

13. The semiconductor composition of claim 5, wherein the semiconductor polymer has the structure of one of Formulas (2), (3), (7), (8), (11), or (12):

Formula (2)

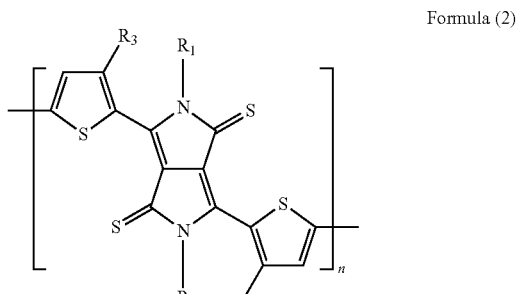

Formula (3)

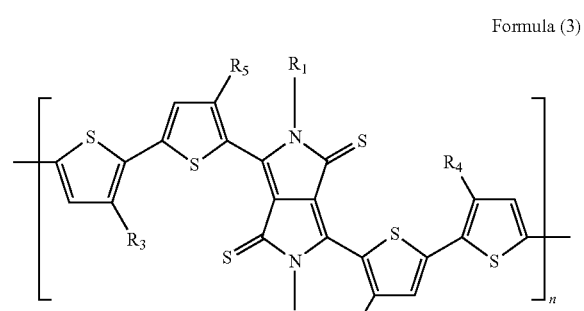

Formula (7)

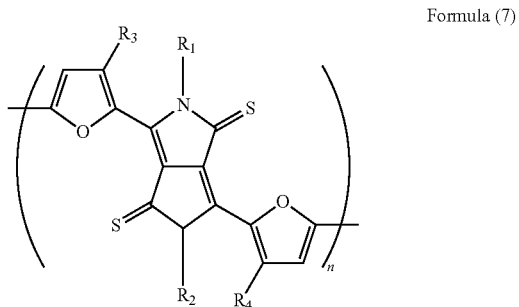

Formula (8)

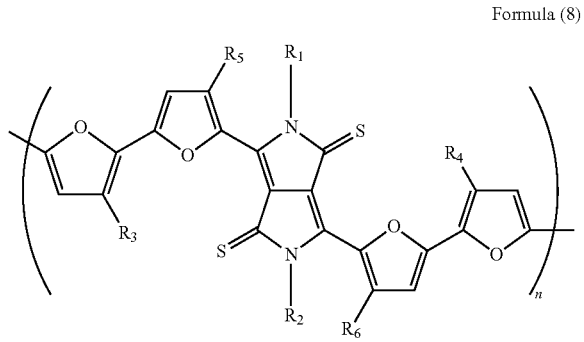

Formula (11)

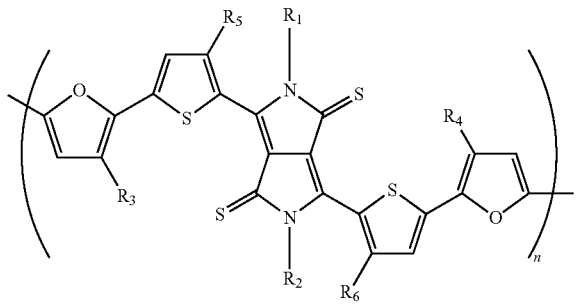

Formula (12)

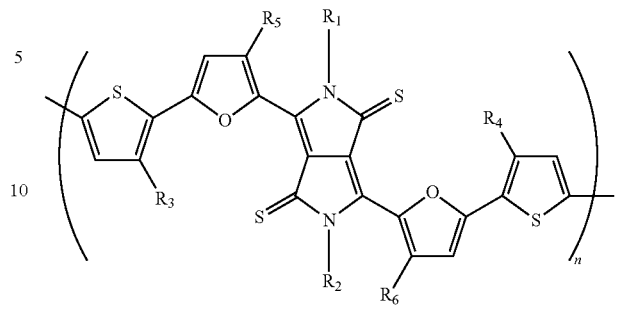

wherein $R_1$ and $R_2$ are independently hydrogen, alkyl, substituted alkyl, aryl, or substituted aryl;

$R_3$, $R_4$, $R_5$, and $R_6$ are independently hydrogen, alkyl, substituted alkyl, aryl, substituted aryl, heteroaryl, substituted heteroaryl, halogen, alkoxy, alkylthio, trialkylsilyl, —CN, or —NO$_2$; and n is from 2 to about 5,000.

14. The semiconductor composition of claim 5, wherein the semiconductor polymer has the structure of one of Formulas (4), (6), (14), or (17):

Formula (4)

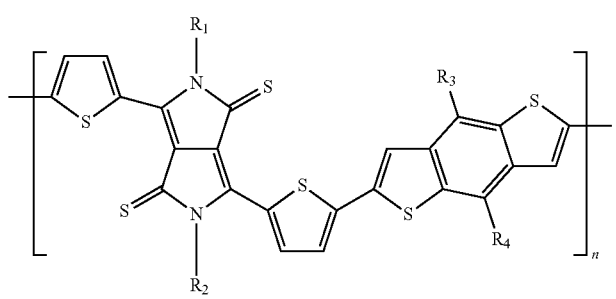

Formula (6)

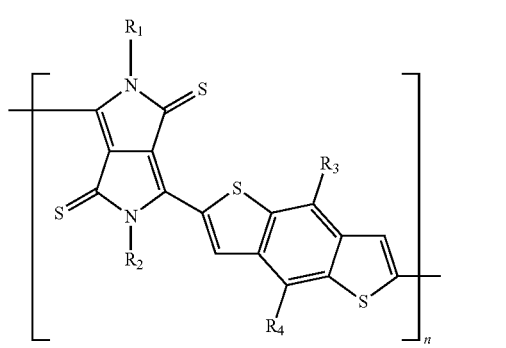

Formula (14)

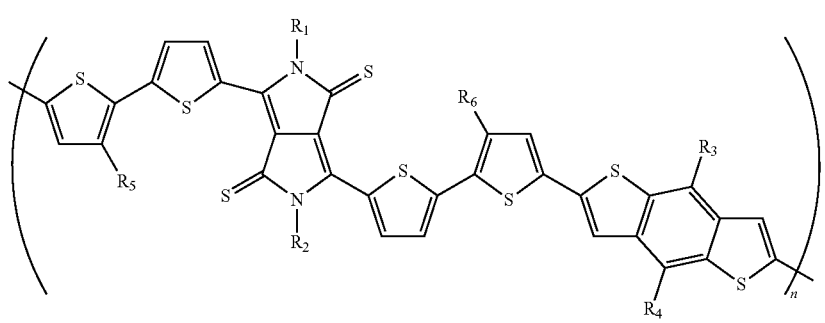

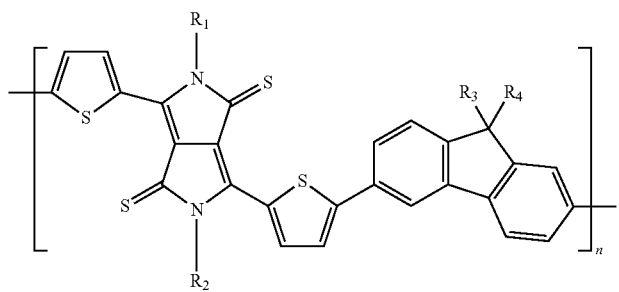

wherein $R_1$ and $R_2$ are independently hydrogen, alkyl, substituted alkyl, aryl, or substituted aryl;

$R_3$, $R_4$, $R_5$, and $R_6$ are independently hydrogen, alkyl, substituted alkyl, aryl, substituted aryl, heteroaryl, substituted heteroaryl, halogen, alkoxy, alkylthio, trialkylsilyl, —CN, or —NO$_2$; and n is from 2 to about 5,000.

15. The semiconductor composition of claim 5, wherein the semiconductor polymer has the structure of one of Formulas (9), (10), or (20):

Formula (9)

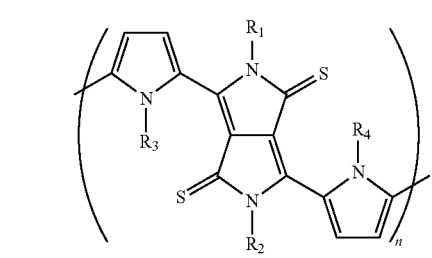

Formula (10)

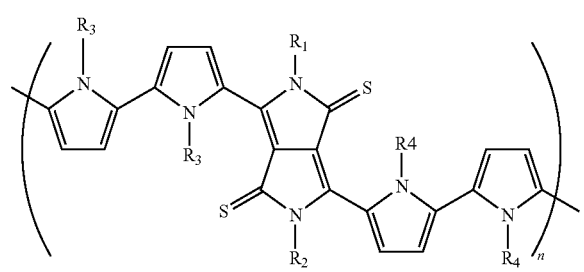

Formula (20)

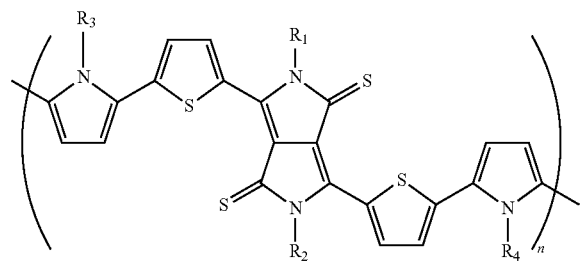

wherein $R_1$ and $R_2$ are independently hydrogen, alkyl, substituted alkyl, aryl, or substituted aryl;

$R_3$, $R_4$, $R_5$, and $R_6$ are independently hydrogen, alkyl, substituted alkyl, aryl, substituted aryl, heteroaryl, substituted heteroaryl, halogen, alkoxy, alkylthio, trialkylsilyl, —CN, or —NO$_2$; and n is from 2 to about 5,000.

16. The semiconductor composition of claim 5, wherein the semiconductor polymer has the structure of one of Formulas (15), (16), or (19):

Formula (15)

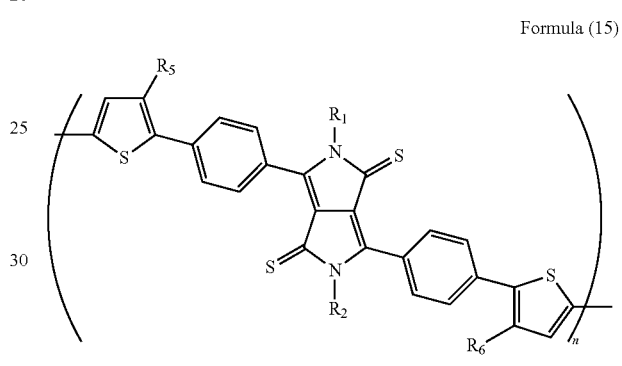

Formula (16)

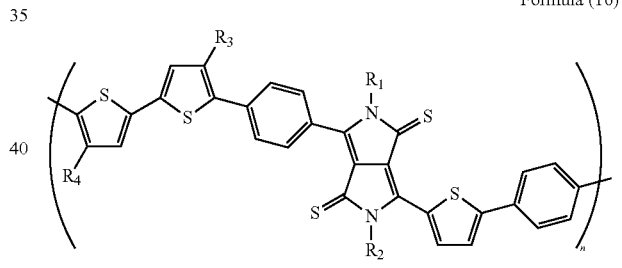

Formula (19)

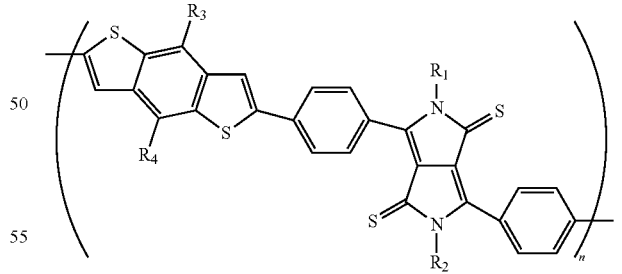

wherein $R_1$ and $R_2$ are independently hydrogen, alkyl, substituted alkyl, aryl, or substituted aryl;

$R_3$, $R_4$, $R_5$, and $R_6$ are independently hydrogen, alkyl, substituted alkyl, aryl, substituted aryl, heteroaryl, substituted heteroaryl, halogen, alkoxy, alkylthio, trialkylsilyl, —CN, or —NO$_2$; and n is from 2 to about 5,000.

17. The electronic device of claim 7, wherein the polymer has the structure of one of Formulas (2), (3), (7), (8), (11), or (12):

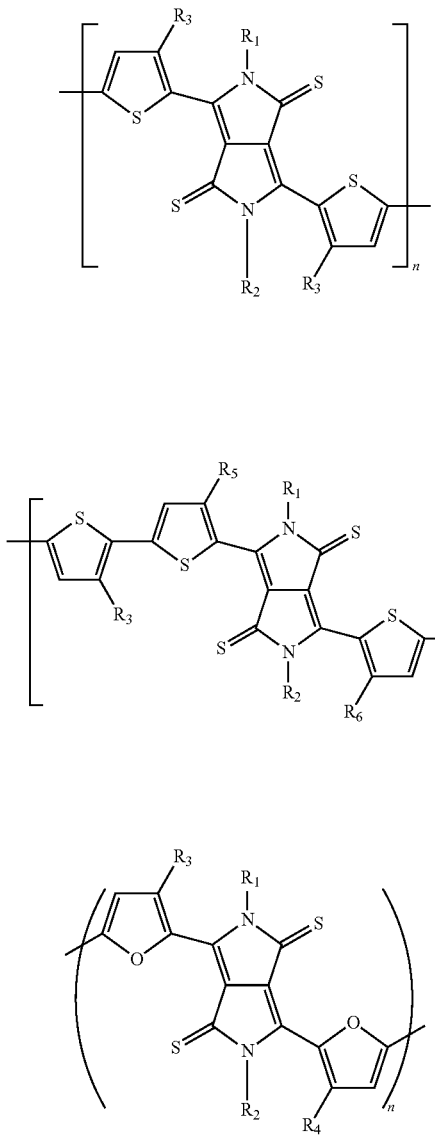

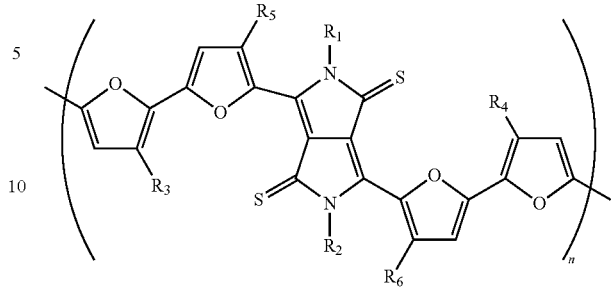

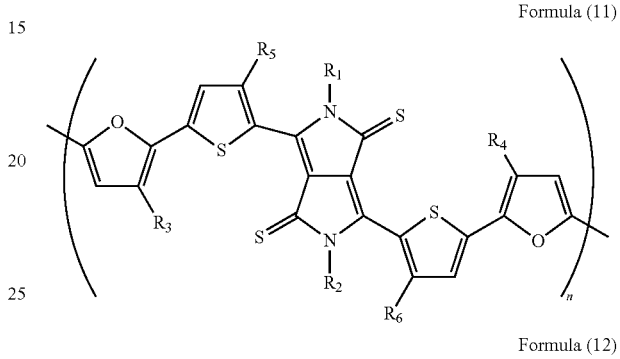

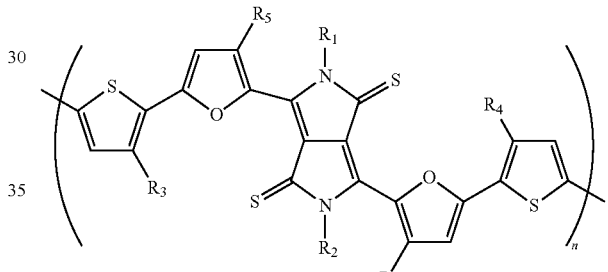

wherein $R_1$ and $R_2$ are independently hydrogen, alkyl, substituted alkyl, aryl, or substituted aryl;

$R_3$, $R_4$, $R_5$, and $R_6$ are independently hydrogen, alkyl, substituted alkyl, aryl, substituted aryl, heteroaryl, substituted heteroaryl, halogen, alkoxy, alkylthio, trialkylsilyl, —CN, or —NO$_2$; and n is from 2 to about 5,000.

18. The electronic device of claim 7, wherein the polymer has the structure of one of Formulas (4), (6), (14), or (17):

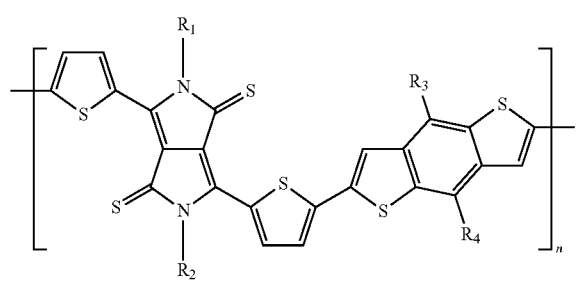

-continued

Formula (6)

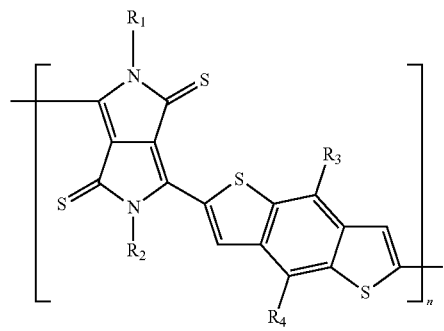

Formula (14)

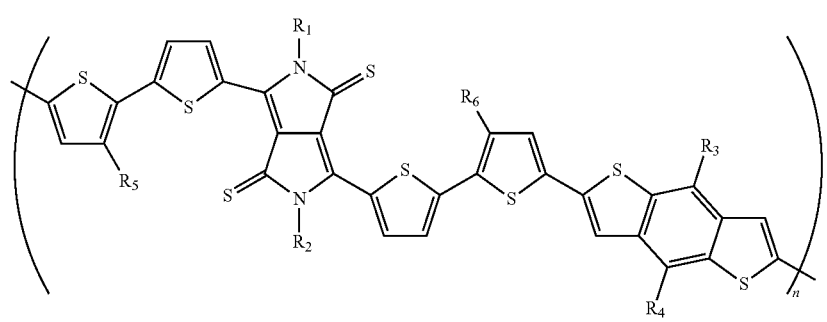

Formula (17)

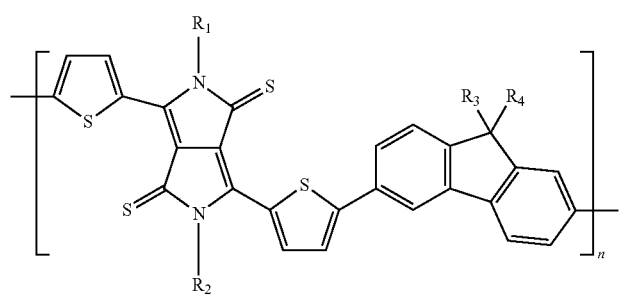

wherein $R_1$ and $R_2$ are independently hydrogen, alkyl, substituted alkyl, aryl, or substituted aryl;

$R_3$, $R_4$, $R_5$, and $R_6$ are independently hydrogen, alkyl, substituted alkyl, aryl, substituted aryl, heteroaryl, substituted heteroaryl, halogen, alkoxy, alkylthio, trialkylsilyl, —CN, or —NO$_2$; and n is from 2 to about 5,000.

19. The electronic device of claim 7, wherein the polymer has the structure of one of Formulas (9), (10), or (20):

Formula (9)

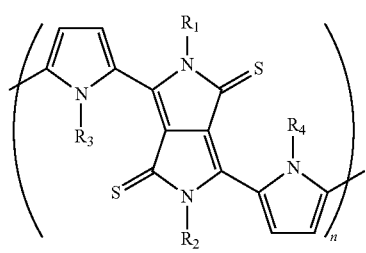

Formula (10)

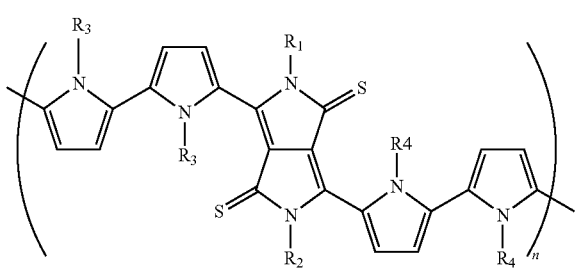

Formula (20)

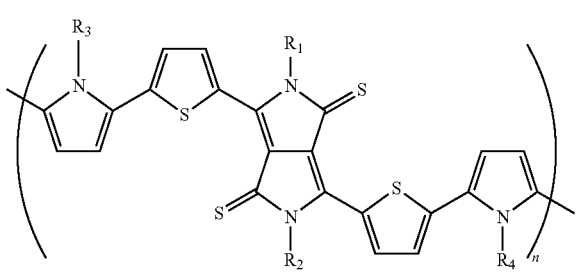

wherein $R_1$ and $R_2$ are independently hydrogen, alkyl, substituted alkyl, aryl, or substituted aryl;

$R_3$, $R_4$, $R_5$, and $R_6$ are independently hydrogen, alkyl, substituted alkyl, aryl, substituted aryl, heteroaryl, substituted heteroaryl, halogen, alkoxy, alkylthio, trialkylsilyl, —CN, or —NO$_2$; and n is from 2 to about 5,000.

20. The electronic device of claim 7, wherein the polymer has the structure of one of Formulas (15), (16), or (19):

Formula (15)

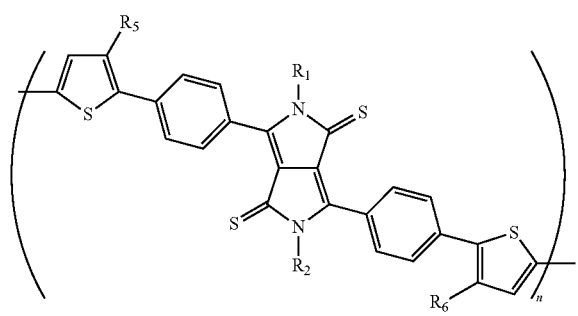

Formula (16)

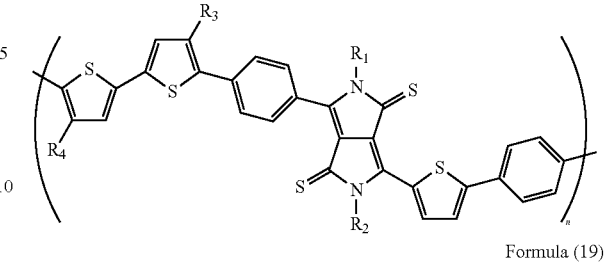

Formula (19)

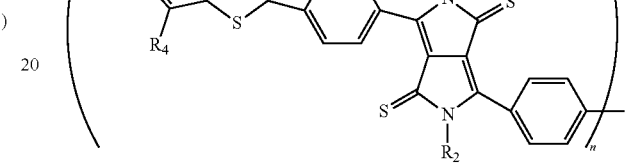

wherein $R_1$ and $R_2$ are independently hydrogen, alkyl, substituted alkyl, aryl, or substituted aryl;

$R_3$, $R_4$, $R_5$, and $R_6$ are independently hydrogen, alkyl, substituted alkyl, aryl, substituted aryl, heteroaryl, substituted heteroaryl, halogen, alkoxy, alkylthio, trialkylsilyl, —CN, or —NO$_2$; and n is from 2 to about 5,000.

* * * * *